United States Patent
Barnes et al.

(10) Patent No.: US 12,311,447 B2
(45) Date of Patent: *May 27, 2025

(54) PROCESS FOR PRODUCING SPHEROIDIZED POWDER FROM FEEDSTOCK MATERIALS

(71) Applicant: 6K Inc., North Andover, MA (US)

(72) Inventors: John Barnes, Sewickley, PA (US); Aaron Bent, Andover, MA (US); Kamal Hadidi, Somerville, MA (US); Makhlouf Redjdal, Melrose, MA (US); Scott Turchetti, Peterborough, NH (US); Saurabh Ullal, Hollis, NH (US); Ning Duanmu, Nashua, NH (US); Michael C. Kozlowski, Melrose, MA (US)

(73) Assignee: 6K Inc., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,586

(22) Filed: Sep. 2, 2022

(65) Prior Publication Data
US 2023/0330747 A1 Oct. 19, 2023

Related U.S. Application Data

(63) Continuation of application No. 17/102,244, filed on Nov. 23, 2020, now Pat. No. 11,465,201, which is a
(Continued)

(51) Int. Cl.
*B22F 9/14* (2006.01)
*B22F 1/065* (2022.01)
(Continued)

(52) U.S. Cl.
CPC ............... *B22F 9/14* (2013.01); *B22F 1/065* (2022.01); *B22F 1/142* (2022.01); *B22F 9/04* (2013.01);
(Continued)

(58) Field of Classification Search
None
See application file for complete search history.

(56) References Cited

U.S. PATENT DOCUMENTS

| 1,699,205 A | 1/1929 | Emil et al. |
| 2,892,215 A | 6/1959 | Gerhard et al. |

(Continued)

FOREIGN PATENT DOCUMENTS

| AU | 2003211869 A1 | 9/2003 |
| AU | 2014394102 B2 | 6/2020 |

(Continued)

OTHER PUBLICATIONS

Nichols, F. A., "On the spheroidization of rod-shaped particles of finite length", Journal of Materials Science, Jun. 1976, vol. 11, pp. 1077-1082.
(Continued)

*Primary Examiner* — George Wyszomierski
(74) *Attorney, Agent, or Firm* — Knobbe, Martens, Olson & Bear, LLP

(57) ABSTRACT

Disclosed herein are embodiments of methods, devices, and assemblies for processing feedstock materials using microwave plasma processing. Specifically, the feedstock materials disclosed herein pertains to scrap materials, dehydrogenated or non-hydrogenated feed material, and recycled used powder. Microwave plasma processing can be used to spheroidize and remove contaminants. Advantageously, microwave plasma processed feedstock can be used in various applications such as additive manufacturing or powdered metallurgy (PM) applications that require high powder flowability.

15 Claims, 13 Drawing Sheets

Related U.S. Application Data continuation of application No. 16/827,322, filed on Mar. 23, 2020, now Pat. No. 11,273,491, which is a continuation of application No. 16/446,445, filed on Jun. 19, 2019, now Pat. No. 10,639,712.

(60) Provisional application No. 62/687,079, filed on Jun. 19, 2018, provisional application No. 62/687,094, filed on Jun. 19, 2018, provisional application No. 62/687,109, filed on Jun. 19, 2018.

(51) Int. Cl.
 *B22F 1/142* (2022.01)
 *B22F 9/04* (2006.01)
 *B33Y 70/00* (2020.01)

(52) U.S. Cl.
 CPC ......... *B33Y 70/00* (2014.12); *B22F 2301/205* (2013.01); *B22F 2304/10* (2013.01)

(56) References Cited

U.S. PATENT DOCUMENTS

| | | |
|---|---|---|
| 3,290,723 A | 12/1966 | John et al. |
| 3,293,334 A | 12/1966 | Bylund et al. |
| 3,434,831 A | 3/1969 | Knopp |
| 3,466,165 A | 9/1969 | Rhys et al. |
| RE26,879 E | 5/1970 | Kelso |
| 3,652,259 A | 3/1972 | Knopp |
| 3,802,816 A | 4/1974 | Kaufmann |
| 3,845,344 A | 10/1974 | Rainer |
| 3,909,241 A | 9/1975 | Cheney et al. |
| 3,966,374 A | 6/1976 | Honnorat et al. |
| 3,974,245 A | 8/1976 | Cheney et al. |
| 4,076,640 A | 2/1978 | Forgensi et al. |
| 4,177,026 A | 12/1979 | Honnorat et al. |
| 4,212,837 A | 7/1980 | Kubo et al. |
| 4,221,554 A | 9/1980 | Oguchi et al. |
| 4,221,775 A | 9/1980 | Anno |
| 4,423,303 A | 12/1983 | Hirose et al. |
| 4,431,449 A | 2/1984 | Dillon et al. |
| 4,439,410 A | 3/1984 | Santen et al. |
| 4,544,404 A | 10/1985 | Yolton et al. |
| 4,569,823 A | 2/1986 | Westin |
| 4,599,880 A | 7/1986 | Stepanenko et al. |
| 4,611,108 A | 9/1986 | Leprince et al. |
| 4,670,047 A | 6/1987 | Kopatz et al. |
| 4,692,584 A | 9/1987 | Caneer |
| 4,705,560 A | 11/1987 | Kemp et al. |
| 4,711,660 A | 12/1987 | Kemp et al. |
| 4,711,661 A | 12/1987 | Kemp et al. |
| 4,714,587 A | 12/1987 | Eylon et al. |
| 4,731,110 A | 3/1988 | Kopatz et al. |
| 4,731,111 A | 3/1988 | Kopatz et al. |
| 4,772,315 A | 9/1988 | Johnson et al. |
| 4,778,515 A | 10/1988 | Kemp et al. |
| 4,780,131 A | 10/1988 | Kemp et al. |
| 4,783,216 A | 11/1988 | Kemp et al. |
| 4,783,218 A | 11/1988 | Kemp et al. |
| 4,787,934 A | 11/1988 | Johnson et al. |
| 4,802,915 A | 2/1989 | Kopatz et al. |
| 4,836,850 A | 6/1989 | Kemp et al. |
| 4,859,237 A | 8/1989 | Johnson et al. |
| 4,923,509 A | 5/1990 | Kemp et al. |
| 4,943,322 A | 7/1990 | Kemp et al. |
| 4,944,797 A | 7/1990 | Kemp et al. |
| 4,952,389 A | 8/1990 | Szymanski et al. |
| 5,041,713 A | 8/1991 | Weidman |
| 5,095,048 A | 3/1992 | Takahashi et al. |
| 5,114,471 A | 5/1992 | Johnson et al. |
| 5,126,104 A | 6/1992 | Anand et al. |
| 5,131,992 A | 7/1992 | Church et al. |
| 5,200,595 A | 4/1993 | Boulos et al. |
| 5,290,507 A | 3/1994 | Runkle |
| 5,292,370 A | 3/1994 | Tsai et al. |
| 5,376,475 A | 12/1994 | Ovshinsky et al. |
| 5,411,592 A | 5/1995 | Ovshinsky et al. |
| 5,431,967 A | 7/1995 | Manthiram et al. |
| 5,518,831 A | 5/1996 | Tou et al. |
| 5,676,919 A | 10/1997 | Kawamura et al. |
| 5,750,013 A | 5/1998 | Lin |
| 5,776,323 A | 7/1998 | Kobashi |
| 5,958,361 A | 9/1999 | Laine et al. |
| 5,980,977 A | 11/1999 | Deng et al. |
| 5,989,648 A | 11/1999 | Phillips |
| 6,027,585 A | 2/2000 | Patterson et al. |
| 6,221,125 B1 | 4/2001 | Soda et al. |
| 6,261,484 B1 | 7/2001 | Phillips et al. |
| 6,274,110 B1 | 8/2001 | Kim et al. |
| 6,329,628 B1 | 12/2001 | Kuo et al. |
| 6,334,882 B1 | 1/2002 | Aaslund |
| 6,376,027 B1 | 4/2002 | Lee et al. |
| 6,409,851 B1 | 6/2002 | Sethuram et al. |
| 6,428,600 B1 | 8/2002 | Flurschuetz et al. |
| 6,518,667 B1* | 2/2003 | Ichida ............... H01L 23/49816 257/734 |
| 6,543,380 B1 | 4/2003 | Sung-Spitzl |
| 6,551,377 B1 | 4/2003 | Leonhardt |
| 6,569,397 B1 | 5/2003 | Yadav et al. |
| 6,579,573 B2 | 6/2003 | Strutt et al. |
| 6,589,311 B1 | 7/2003 | Han et al. |
| 6,607,693 B1 | 8/2003 | Saito et al. |
| 6,652,822 B2 | 11/2003 | Phillips et al. |
| 6,676,728 B2 | 1/2004 | Han et al. |
| 6,689,192 B1 | 2/2004 | Phillips et al. |
| 6,752,979 B1 | 6/2004 | Talbot et al. |
| 6,755,886 B2 | 6/2004 | Phillips et al. |
| 6,780,219 B2 | 8/2004 | Singh et al. |
| 6,793,849 B1 | 9/2004 | Gruen et al. |
| 6,805,822 B2 | 10/2004 | Takei et al. |
| 6,838,072 B1 | 1/2005 | Kong et al. |
| 6,869,550 B2 | 3/2005 | Dorfman et al. |
| 6,902,745 B2 | 6/2005 | Lee et al. |
| 6,919,257 B2 | 7/2005 | Gealy et al. |
| 6,919,527 B2 | 7/2005 | Boulos et al. |
| 6,989,529 B2 | 1/2006 | Wiseman |
| 7,066,980 B2 | 6/2006 | Akimoto et al. |
| 7,091,441 B1 | 8/2006 | Kuo |
| 7,108,733 B2 | 9/2006 | Enokido |
| 7,125,537 B2 | 10/2006 | Liao et al. |
| 7,125,822 B2 | 10/2006 | Nakano et al. |
| 7,175,786 B2 | 2/2007 | Celikkaya et al. |
| 7,182,929 B1 | 2/2007 | Singhal et al. |
| 7,220,398 B2 | 5/2007 | Sutorik et al. |
| 7,235,118 B2 | 6/2007 | Bouaricha et al. |
| 7,285,194 B2 | 10/2007 | Uno et al. |
| 7,285,307 B2 | 10/2007 | Hohenthanner et al. |
| 7,297,310 B1 | 11/2007 | Peng et al. |
| 7,297,892 B2 | 11/2007 | Kelley et al. |
| 7,344,776 B2 | 3/2008 | Kollmann et al. |
| 7,357,910 B2 | 4/2008 | Phillips et al. |
| 7,368,130 B2 | 5/2008 | Kim et al. |
| 7,374,704 B2 | 5/2008 | Che et al. |
| 7,375,303 B2 | 5/2008 | Twarog |
| 7,431,750 B2 | 10/2008 | Liao et al. |
| 7,442,271 B2 | 10/2008 | Asmussen et al. |
| 7,491,468 B2 | 2/2009 | Okada et al. |
| 7,517,513 B2 | 4/2009 | Sarkas et al. |
| 7,524,353 B2 | 4/2009 | Johnson et al. |
| 7,534,296 B2 | 5/2009 | Swain et al. |
| 7,572,315 B2 | 8/2009 | Boulos et al. |
| 7,622,211 B2 | 11/2009 | Vyas et al. |
| 7,629,553 B2 | 12/2009 | Fanson et al. |
| 7,700,152 B2 | 4/2010 | Laine et al. |
| 7,776,303 B2 | 8/2010 | Hung et al. |
| 7,806,077 B2 | 10/2010 | Lee et al. |
| 7,828,999 B2 | 11/2010 | Yubuta et al. |
| 7,901,658 B2 | 3/2011 | Weppner et al. |
| 7,931,836 B2 | 4/2011 | Xie et al. |
| 7,939,141 B2 | 5/2011 | Matthews et al. |
| 8,007,691 B2 | 8/2011 | Sawaki et al. |
| 8,043,405 B2 | 10/2011 | Johnson et al. |
| 8,092,941 B2 | 1/2012 | Weppner et al. |
| 8,101,061 B2 | 1/2012 | Suh et al. |

(56) References Cited

U.S. PATENT DOCUMENTS

| | | |
|---|---|---|
| 8,168,128 B2 | 5/2012 | Seeley et al. |
| 8,178,240 B2 | 5/2012 | Wang et al. |
| 8,192,865 B2 | 6/2012 | Buiel et al. |
| 8,193,291 B2 | 6/2012 | Zhang |
| 8,211,388 B2 | 7/2012 | Woodfield et al. |
| 8,268,230 B2 | 9/2012 | Cherepy et al. |
| 8,283,275 B2 | 10/2012 | Heo et al. |
| 8,303,926 B1 | 11/2012 | Luhrs et al. |
| 8,329,090 B2 | 12/2012 | Hollingsworth et al. |
| 8,329,257 B2 | 12/2012 | Larouche et al. |
| 8,338,323 B2 | 12/2012 | Takasu et al. |
| 8,389,160 B2 | 3/2013 | Venkatachalam et al. |
| 8,420,043 B2 | 4/2013 | Gamo et al. |
| 8,439,998 B2 | 5/2013 | Ito et al. |
| 8,449,950 B2 | 5/2013 | Shang et al. |
| 8,478,785 B2 | 7/2013 | Jamjoom et al. |
| 8,492,303 B2 | 7/2013 | Bulan et al. |
| 8,529,996 B2 | 9/2013 | Bocian et al. |
| 8,592,767 B2 | 11/2013 | Rappe et al. |
| 8,597,722 B2 | 12/2013 | Albano et al. |
| 8,623,555 B2 | 1/2014 | Kang et al. |
| 8,658,317 B2 | 2/2014 | Weppner et al. |
| 8,685,593 B2 | 4/2014 | Dadheech et al. |
| 8,728,680 B2 | 5/2014 | Mikhail et al. |
| 8,735,022 B2 | 5/2014 | Schlag et al. |
| 8,748,785 B2 | 6/2014 | Jordan et al. |
| 8,758,957 B2 | 6/2014 | Dadheech et al. |
| 8,784,706 B2 | 7/2014 | Shevchenko et al. |
| 8,822,000 B2 | 9/2014 | Kumagai et al. |
| 8,840,701 B2 | 9/2014 | Borland et al. |
| 8,877,119 B2 | 11/2014 | Jordan et al. |
| 8,911,529 B2 | 12/2014 | Withers et al. |
| 8,919,428 B2 | 12/2014 | Cola et al. |
| 8,945,431 B2 | 2/2015 | Schulz et al. |
| 8,951,496 B2 | 2/2015 | Hadidi et al. |
| 8,956,785 B2 | 2/2015 | Dadheech et al. |
| 8,968,587 B2 | 3/2015 | Shin et al. |
| 8,968,669 B2 | 3/2015 | Chen |
| 8,980,485 B2 | 3/2015 | Lanning et al. |
| 8,999,440 B2 | 4/2015 | Zenasni et al. |
| 9,023,259 B2 | 5/2015 | Hadidi et al. |
| 9,065,141 B2 | 6/2015 | Merzougui et al. |
| 9,067,264 B2 | 6/2015 | Moxson et al. |
| 9,079,778 B2 | 7/2015 | Kelley et al. |
| 9,085,490 B2 | 7/2015 | Taylor et al. |
| 9,101,982 B2 | 8/2015 | Christer |
| 9,136,569 B2 | 9/2015 | Song et al. |
| 9,150,422 B2 | 10/2015 | Nakayama et al. |
| 9,193,133 B2 | 11/2015 | Shin et al. |
| 9,196,901 B2 | 11/2015 | Se-Hee et al. |
| 9,196,905 B2 | 11/2015 | Tzeng et al. |
| 9,206,085 B2 | 12/2015 | Hadidi et al. |
| 9,242,224 B2 | 1/2016 | Redjdal et al. |
| 9,259,785 B2 | 2/2016 | Hadidi et al. |
| 9,293,302 B2 | 3/2016 | Risby et al. |
| 9,321,071 B2 | 4/2016 | Jordan et al. |
| 9,322,081 B2 | 4/2016 | McHugh et al. |
| 9,352,278 B2 | 5/2016 | Spatz et al. |
| 9,356,281 B2 | 5/2016 | Verbrugge et al. |
| 9,368,772 B1 | 6/2016 | Chen et al. |
| 9,412,998 B2 | 8/2016 | Rojeski et al. |
| 9,421,612 B2 | 8/2016 | Fang et al. |
| 9,425,463 B2 | 8/2016 | Hsu et al. |
| 9,463,435 B2 | 10/2016 | Schulz et al. |
| 9,520,600 B2 | 12/2016 | Dadheech et al. |
| 9,624,565 B2 | 4/2017 | Lee et al. |
| 9,630,162 B1 | 4/2017 | Sunkara et al. |
| 9,643,891 B2 | 5/2017 | Hadidi et al. |
| 9,700,877 B2 | 7/2017 | Kim et al. |
| 9,705,136 B2 | 7/2017 | Rojeski |
| 9,718,131 B2 | 8/2017 | Boulos et al. |
| 9,735,427 B2 | 8/2017 | Zhang |
| 9,738,788 B1 | 8/2017 | Gross et al. |
| 9,751,129 B2 | 9/2017 | Boulos et al. |
| 9,768,033 B2 | 9/2017 | Ranjan et al. |
| 9,776,378 B2 | 10/2017 | Choi |
| 9,782,791 B2 | 10/2017 | Redjdal et al. |
| 9,782,828 B2 | 10/2017 | Wilkinson |
| 9,796,019 B2 | 10/2017 | She et al. |
| 9,796,020 B2 | 10/2017 | Aslund |
| 9,831,503 B2 | 11/2017 | Sopchak |
| 9,871,248 B2 | 1/2018 | Rayner et al. |
| 9,879,344 B2 | 1/2018 | Lee et al. |
| 9,899,674 B2 | 2/2018 | Hirai et al. |
| 9,917,299 B2 | 3/2018 | Behan et al. |
| 9,932,673 B2 | 4/2018 | Jordan et al. |
| 9,945,034 B2 | 4/2018 | Yao et al. |
| 9,947,926 B2 | 4/2018 | Kim et al. |
| 9,981,284 B2 | 5/2018 | Guo et al. |
| 9,991,458 B2 | 6/2018 | Rosenman et al. |
| 9,999,922 B1 | 6/2018 | Struve |
| 10,011,491 B2 | 7/2018 | Lee et al. |
| 10,050,303 B2 | 8/2018 | Anandan et al. |
| 10,057,986 B2 | 8/2018 | Prud'Homme et al. |
| 10,065,240 B2 | 9/2018 | Chen |
| 10,079,392 B2 | 9/2018 | Huang et al. |
| 10,116,000 B1 | 10/2018 | Federici et al. |
| 10,130,994 B2 | 11/2018 | Fang et al. |
| 10,167,556 B2 | 1/2019 | Ruzic et al. |
| 10,170,753 B2 | 1/2019 | Ren et al. |
| 10,193,142 B2 | 1/2019 | Rojeski |
| 10,244,614 B2 | 3/2019 | Foret |
| 10,319,537 B2 | 6/2019 | Claussen et al. |
| 10,333,183 B2 | 6/2019 | Sloop |
| 10,350,680 B2 | 7/2019 | Yamamoto et al. |
| 10,411,253 B2 | 9/2019 | Tzeng et al. |
| 10,439,206 B2 | 10/2019 | Behan et al. |
| 10,442,000 B2 | 10/2019 | Fukada et al. |
| 10,461,298 B2 | 10/2019 | Herle |
| 10,477,665 B2 | 11/2019 | Hadidi et al. |
| 10,493,524 B2 | 12/2019 | She et al. |
| 10,522,300 B2 | 12/2019 | Yang |
| 10,526,684 B2 | 1/2020 | Ekman et al. |
| 10,529,486 B2 | 1/2020 | Nishisaka |
| 10,543,534 B2 | 1/2020 | Hadidi et al. |
| 10,593,985 B2 | 3/2020 | Sastry et al. |
| 10,610,929 B2 | 4/2020 | Fang et al. |
| 10,637,029 B2 | 4/2020 | Gotlib Vainshtein et al. |
| 10,638,592 B2 | 4/2020 | Foret |
| 10,639,712 B2 | 5/2020 | Barnes et al. |
| 10,647,824 B2 | 5/2020 | Hwang et al. |
| 10,655,206 B2 | 5/2020 | Moon et al. |
| 10,665,890 B2 | 5/2020 | Kang et al. |
| 10,668,566 B2 | 6/2020 | Smathers et al. |
| 10,669,437 B2 | 6/2020 | Cox et al. |
| 10,688,564 B2 | 6/2020 | Boulos et al. |
| 10,707,477 B2 | 7/2020 | Sastry et al. |
| 10,717,150 B2 | 7/2020 | Aleksandrov et al. |
| 10,727,477 B2 | 7/2020 | Kim et al. |
| 10,741,845 B2 | 8/2020 | Yushin et al. |
| 10,744,590 B2 | 8/2020 | Maier et al. |
| 10,756,334 B2 | 8/2020 | Stowell et al. |
| 10,766,787 B1 | 9/2020 | Sunkara et al. |
| 10,777,804 B2 | 9/2020 | Sastry et al. |
| 10,858,255 B2 | 12/2020 | Koziol et al. |
| 10,858,500 B2 | 12/2020 | Chen et al. |
| 10,892,477 B2 | 1/2021 | Choi et al. |
| 10,930,473 B2 | 2/2021 | Paukner et al. |
| 10,943,744 B2 | 3/2021 | Sungail et al. |
| 10,944,093 B2 | 3/2021 | Paz et al. |
| 10,964,938 B2 | 3/2021 | Rojeski |
| 10,987,735 B2 | 4/2021 | Hadidi et al. |
| 10,998,552 B2 | 5/2021 | Lanning et al. |
| 11,031,641 B2 | 6/2021 | Gupta et al. |
| 11,050,061 B2 | 6/2021 | Kim et al. |
| 11,072,533 B2 | 7/2021 | Shevchenko et al. |
| 11,077,524 B2 | 8/2021 | Smathers et al. |
| 11,108,050 B2 | 8/2021 | Kim et al. |
| 11,116,000 B2 | 9/2021 | Sandberg et al. |
| 11,130,175 B2 | 9/2021 | Parrish et al. |
| 11,130,994 B2 | 9/2021 | Shachar et al. |
| 11,133,495 B2 | 9/2021 | Gazda et al. |
| 11,148,202 B2 | 10/2021 | Hadidi et al. |
| 11,167,556 B2 | 11/2021 | Shimada et al. |

(56) References Cited

U.S. PATENT DOCUMENTS

| | | |
|---|---|---|
| 11,170,753 B2 | 11/2021 | Nomura et al. |
| 11,171,322 B2 | 11/2021 | Seol et al. |
| 11,183,682 B2 | 11/2021 | Sunkara et al. |
| 11,193,142 B2 | 12/2021 | Angelidaki et al. |
| 11,196,045 B2 | 12/2021 | Dadheech et al. |
| 11,219,884 B2 | 1/2022 | Takeda et al. |
| 11,244,614 B2 | 2/2022 | He et al. |
| 11,245,065 B1 | 2/2022 | Ouderkirk et al. |
| 11,245,109 B2 | 2/2022 | Tzeng et al. |
| 11,254,585 B2 | 2/2022 | Ekman et al. |
| 11,273,322 B2 | 3/2022 | Zanata et al. |
| 11,273,491 B2 | 3/2022 | Barnes et al. |
| 11,299,397 B2 | 4/2022 | Lanning et al. |
| 11,311,938 B2 | 4/2022 | Badwe et al. |
| 11,319,537 B2 | 5/2022 | Dames et al. |
| 11,333,183 B2 | 5/2022 | Desai et al. |
| 11,335,911 B2 | 5/2022 | Lanning et al. |
| 11,350,680 B2 | 6/2022 | Rutkoski et al. |
| 11,411,253 B2 | 8/2022 | Busacca et al. |
| 11,439,206 B2 | 9/2022 | Santos |
| 11,442,000 B2 | 9/2022 | Vaez-Iravani et al. |
| 11,461,298 B1 | 10/2022 | Shemmer et al. |
| 11,465,201 B2 | 10/2022 | Barnes et al. |
| 11,471,941 B2 | 10/2022 | Barnet et al. |
| 11,477,665 B2 | 10/2022 | Franke et al. |
| 11,577,314 B2 | 2/2023 | Hadidi et al. |
| 11,590,568 B2 | 2/2023 | Badwe et al. |
| 11,611,130 B2 | 3/2023 | Wrobel et al. |
| 11,633,785 B2 | 4/2023 | Badwe et al. |
| 11,717,886 B2 | 8/2023 | Badwe et al. |
| 11,839,919 B2 | 12/2023 | Hadidi et al. |
| 12,042,861 B2 | 7/2024 | Badwe |
| 2001/0016283 A1 | 8/2001 | Shiraishi et al. |
| 2001/0021740 A1 | 9/2001 | Lodyga et al. |
| 2002/0112794 A1 | 8/2002 | Sethuram et al. |
| 2003/0027021 A1 | 2/2003 | Sharivker et al. |
| 2003/0077398 A1 | 4/2003 | Strutt et al. |
| 2003/0129497 A1 | 7/2003 | Yamamoto et al. |
| 2003/0172772 A1 | 9/2003 | Sethuram et al. |
| 2003/0186128 A1 | 10/2003 | Singh et al. |
| 2003/0207978 A1 | 11/2003 | Yadav et al. |
| 2004/0013941 A1 | 1/2004 | Kobayashi et al. |
| 2004/0045807 A1 | 3/2004 | Sarkas et al. |
| 2004/0060387 A1 | 4/2004 | Tanner-Jones |
| 2004/0123699 A1 | 7/2004 | Liao et al. |
| 2005/0025698 A1 | 2/2005 | Talbot et al. |
| 2005/0072496 A1 | 4/2005 | Hwang et al. |
| 2005/0163696 A1 | 7/2005 | Uhm et al. |
| 2005/0242070 A1 | 11/2005 | Hammer |
| 2005/0260786 A1 | 11/2005 | Yoshikawa et al. |
| 2006/0040168 A1 | 2/2006 | Sridhar |
| 2006/0141153 A1 | 6/2006 | Kubota et al. |
| 2006/0145124 A1 | 7/2006 | Hsiao et al. |
| 2006/0291827 A1 | 12/2006 | Suib et al. |
| 2007/0077350 A1 | 4/2007 | Hohenthanner et al. |
| 2007/0089860 A1 | 4/2007 | Hou et al. |
| 2007/0209758 A1 | 9/2007 | Sompalli et al. |
| 2007/0221635 A1 | 9/2007 | Boulos et al. |
| 2007/0259768 A1 | 11/2007 | Kear et al. |
| 2008/0029485 A1 | 2/2008 | Kelley et al. |
| 2008/0182114 A1 | 7/2008 | Kim et al. |
| 2008/0220244 A1 | 9/2008 | Wai et al. |
| 2008/0286490 A1 | 11/2008 | Bogdanoff et al. |
| 2008/0296268 A1 | 12/2008 | Mike et al. |
| 2008/0305025 A1 | 12/2008 | Vitner et al. |
| 2009/0074655 A1 | 3/2009 | Suciu |
| 2009/0093553 A1 | 4/2009 | Kleine et al. |
| 2009/0155689 A1 | 6/2009 | Zaghib et al. |
| 2009/0202869 A1 | 8/2009 | Sawaki et al. |
| 2009/0258255 A1 | 10/2009 | Terashima et al. |
| 2009/0305132 A1 | 12/2009 | Gauthier et al. |
| 2010/0007162 A1 | 1/2010 | Han et al. |
| 2010/0096362 A1 | 4/2010 | Hirayama et al. |
| 2010/0176524 A1 | 7/2010 | Burgess et al. |
| 2011/0006254 A1 | 1/2011 | Richard et al. |
| 2012/0015284 A1 | 1/2012 | Merzougui et al. |
| 2012/0027955 A1 | 2/2012 | Sunkara et al. |
| 2012/0034135 A1 | 2/2012 | Risby |
| 2012/0048064 A1 | 3/2012 | Kasper et al. |
| 2012/0051962 A1 | 3/2012 | Imam et al. |
| 2012/0074342 A1 | 3/2012 | Kim et al. |
| 2012/0100438 A1 | 4/2012 | Fasching et al. |
| 2012/0122017 A1 | 5/2012 | Mills |
| 2012/0230860 A1 | 9/2012 | Ward-Close et al. |
| 2012/0240726 A1 | 9/2012 | Kim et al. |
| 2012/0294919 A1 | 11/2012 | Jaynes et al. |
| 2013/0032753 A1 | 2/2013 | Yamamoto et al. |
| 2013/0071284 A1 | 3/2013 | Kano et al. |
| 2013/0078508 A1 | 3/2013 | Tolbert et al. |
| 2013/0084474 A1 | 4/2013 | Mills |
| 2014/0202286 A1 | 7/2014 | Yokoyama et al. |
| 2014/0272430 A1 | 9/2014 | Kalayaraman |
| 2014/0322632 A1 | 10/2014 | Sugimoto et al. |
| 2014/0373344 A1 | 12/2014 | Takada et al. |
| 2015/0000844 A1 | 1/2015 | Woo |
| 2015/0101454 A1 | 4/2015 | Shimizu et al. |
| 2015/0167143 A1 | 6/2015 | Luce et al. |
| 2015/0171455 A1 | 6/2015 | Mills |
| 2015/0255767 A1 | 9/2015 | Aetukuri et al. |
| 2015/0259220 A1 | 9/2015 | Rosocha et al. |
| 2015/0333307 A1 | 11/2015 | Thokchom et al. |
| 2016/0028088 A1 | 1/2016 | Romeo et al. |
| 2016/0045841 A1 | 2/2016 | Kaplan et al. |
| 2016/0152480 A1 | 6/2016 | Jang et al. |
| 2016/0285090 A1 | 9/2016 | Ozkan et al. |
| 2016/0287113 A1 | 10/2016 | Hebert et al. |
| 2016/0308244 A1 | 10/2016 | Badding et al. |
| 2016/0332232 A1 | 11/2016 | Forbes et al. |
| 2016/0351910 A1 | 12/2016 | Albano et al. |
| 2017/0009328 A1 | 1/2017 | Germann et al. |
| 2017/0070180 A1 | 3/2017 | Mills |
| 2017/0113935 A1 | 4/2017 | Pennington et al. |
| 2017/0120339 A1 | 5/2017 | Aslund |
| 2017/0125842 A1 | 5/2017 | Meguro et al. |
| 2017/0151609 A1 | 6/2017 | Elsen et al. |
| 2017/0176977 A1 | 6/2017 | Huang et al. |
| 2017/0179477 A1 | 6/2017 | Walters et al. |
| 2017/0209922 A1 | 7/2017 | Kato et al. |
| 2017/0368604 A1 | 12/2017 | Wilkinson |
| 2017/0373344 A1 | 12/2017 | Hadidi et al. |
| 2018/0022928 A1 | 1/2018 | Blush |
| 2018/0025794 A1 | 1/2018 | Lahoda et al. |
| 2018/0083264 A1 | 3/2018 | Soppe |
| 2018/0104745 A1 | 4/2018 | L'Esperance et al. |
| 2018/0159178 A1 | 6/2018 | Weisenstein et al. |
| 2018/0169763 A1 | 6/2018 | Dorval et al. |
| 2018/0214956 A1 | 8/2018 | Larouche et al. |
| 2018/0241956 A1 | 8/2018 | Suzuki |
| 2018/0248175 A1 | 8/2018 | Ghezelbash et al. |
| 2018/0277849 A1 | 9/2018 | Gayden |
| 2018/0346344 A1 | 12/2018 | Chen et al. |
| 2018/0363104 A1 | 12/2018 | Fujieda et al. |
| 2018/0366707 A1 | 12/2018 | Johnson et al. |
| 2018/0375149 A1 | 12/2018 | Beck et al. |
| 2019/0001416 A1 | 1/2019 | Larouche et al. |
| 2019/0061005 A1 | 2/2019 | Kelkar |
| 2019/0084290 A1 | 3/2019 | Stoyanov et al. |
| 2019/0125842 A1 | 5/2019 | Grabowski |
| 2019/0127835 A1 | 5/2019 | Yang et al. |
| 2019/0160528 A1 | 5/2019 | Mcgee et al. |
| 2019/0165413 A1 | 5/2019 | Furusawa |
| 2019/0173130 A1 | 6/2019 | Schuhmacher et al. |
| 2019/0193151 A1 | 6/2019 | Okumura et al. |
| 2019/0218650 A1 | 7/2019 | Subramanian et al. |
| 2019/0271068 A1 | 9/2019 | Sungail et al. |
| 2019/0292441 A1 | 9/2019 | Hill et al. |
| 2019/0334206 A1 | 10/2019 | Sastry et al. |
| 2019/0341650 A9 | 11/2019 | Lanning et al. |
| 2019/0348202 A1 | 11/2019 | Sachdev et al. |
| 2019/0362936 A1 | 11/2019 | Van Den Berg et al. |
| 2019/0389734 A1 | 12/2019 | Dietz et al. |
| 2020/0067128 A1 | 2/2020 | Chmiola et al. |
| 2020/0136176 A1 | 4/2020 | Chen |
| 2020/0149146 A1 | 5/2020 | Chen et al. |

(56) References Cited

U.S. PATENT DOCUMENTS

| | | |
|---|---|---|
| 2020/0153037 A1 | 5/2020 | Renna et al. |
| 2020/0198977 A1 | 6/2020 | Hof et al. |
| 2020/0203706 A1 | 6/2020 | Holman et al. |
| 2020/0207668 A1 | 7/2020 | Cavalli et al. |
| 2020/0220222 A1 | 7/2020 | Watarai et al. |
| 2020/0223704 A1 | 7/2020 | Neale et al. |
| 2020/0227728 A1 | 7/2020 | Huang et al. |
| 2020/0254432 A1 | 8/2020 | Shirman et al. |
| 2020/0276638 A1 | 9/2020 | King et al. |
| 2020/0288561 A1 | 9/2020 | Huh |
| 2020/0314991 A1 | 10/2020 | Duanmu et al. |
| 2020/0335754 A1 | 10/2020 | Ramasubramanian et al. |
| 2020/0335781 A1 | 10/2020 | Oshita et al. |
| 2020/0350542 A1 | 11/2020 | Wrobel et al. |
| 2020/0350565 A1 | 11/2020 | Oshita et al. |
| 2020/0358093 A1 | 11/2020 | Oshita et al. |
| 2020/0358096 A1 | 11/2020 | Paulsen et al. |
| 2020/0388857 A1 | 12/2020 | Sunkara et al. |
| 2020/0391295 A1 | 12/2020 | Dorval et al. |
| 2020/0395607 A1 | 12/2020 | Tzeng |
| 2020/0407858 A1 | 12/2020 | Sano et al. |
| 2021/0047186 A1 | 2/2021 | Ifuku et al. |
| 2021/0075000 A1 | 3/2021 | Holman et al. |
| 2021/0078072 A1 | 3/2021 | Barnes et al. |
| 2021/0085468 A1 | 3/2021 | Ryd et al. |
| 2021/0129216 A1 | 5/2021 | Barnes et al. |
| 2021/0139331 A1 | 5/2021 | Kang et al. |
| 2021/0146432 A1 | 5/2021 | Badwe et al. |
| 2021/0187607 A1 | 6/2021 | Badwe et al. |
| 2021/0187614 A1 | 6/2021 | Tsubota et al. |
| 2021/0226302 A1 | 7/2021 | Lanning et al. |
| 2021/0252599 A1 | 8/2021 | Hadidi et al. |
| 2021/0253430 A1 | 8/2021 | Zaplotnik et al. |
| 2021/0273292 A1 | 9/2021 | Yun et al. |
| 2021/0276094 A1 | 9/2021 | Sobu et al. |
| 2021/0296731 A1 | 9/2021 | Wrobel et al. |
| 2021/0310110 A1 | 10/2021 | Stowell et al. |
| 2021/0344059 A1 | 11/2021 | Ekman et al. |
| 2021/0367264 A1 | 11/2021 | Hadidi et al. |
| 2021/0408533 A1 | 12/2021 | Holman et al. |
| 2022/0041457 A1 | 2/2022 | Pullen et al. |
| 2022/0095445 A1 | 3/2022 | Shang et al. |
| 2022/0118517 A1 | 4/2022 | Hadidi et al. |
| 2022/0127145 A1 | 4/2022 | Ding et al. |
| 2022/0134430 A1 | 5/2022 | Larouche et al. |
| 2022/0134431 A1 | 5/2022 | Badwe et al. |
| 2022/0143693 A1 | 5/2022 | Larouche et al. |
| 2022/0223379 A1 | 7/2022 | Holman et al. |
| 2022/0228288 A1 | 7/2022 | Holman et al. |
| 2022/0267216 A1 | 8/2022 | Holman et al. |
| 2022/0288685 A1 | 9/2022 | Badwe |
| 2022/0314325 A1 | 10/2022 | Badwe |
| 2022/0324022 A1 | 10/2022 | Badwe |
| 2023/0001375 A1 | 1/2023 | Kozlowski et al. |
| 2023/0001376 A1 | 1/2023 | Kozlowski et al. |
| 2023/0032362 A1 | 2/2023 | Holman et al. |
| 2023/0144075 A1 | 5/2023 | Badwe et al. |
| 2023/0211407 A1 | 7/2023 | Hadidi et al. |
| 2023/0219134 A1 | 7/2023 | Houshmand et al. |
| 2023/0330748 A1 | 10/2023 | Badwe et al. |
| 2024/0017322 A1 | 1/2024 | Badwe et al. |
| 2024/0326128 A1 | 10/2024 | Hadidi et al. |

FOREIGN PATENT DOCUMENTS

| | | |
|---|---|---|
| CA | 2947531 A1 | 11/2015 |
| CN | 1188073 A | 7/1998 |
| CN | 1653869 A | 8/2005 |
| CN | 1675785 A | 9/2005 |
| CN | 1967911 A | 5/2007 |
| CN | 101191204 A | 6/2008 |
| CN | 101391307 A | 3/2009 |
| CN | 101728509 A | 6/2010 |
| CN | 101804962 A | 8/2010 |
| CN | 101716686 B | 2/2011 |
| CN | 102394290 A | 3/2012 |
| CN | 102412377 A | 4/2012 |
| CN | 102427130 A | 4/2012 |
| CN | 102664273 A | 9/2012 |
| CN | 102723502 A | 10/2012 |
| CN | 102179521 B | 1/2013 |
| CN | 102867940 A | 1/2013 |
| CN | 102983312 A | 3/2013 |
| CN | 103121105 A | 5/2013 |
| CN | 103402921 A | 11/2013 |
| CN | 102554242 B | 12/2013 |
| CN | 103456926 A | 12/2013 |
| CN | 103682372 A | 3/2014 |
| CN | 103682383 A | 3/2014 |
| CN | 103700815 A | 4/2014 |
| CN | 103874538 A | 6/2014 |
| CN | 103956520 A | 7/2014 |
| CN | 104064736 A | 9/2014 |
| CN | 104084592 A | 10/2014 |
| CN | 104209526 A | 12/2014 |
| CN | 104218213 A | 12/2014 |
| CN | 204156003 U | 2/2015 |
| CN | 104485452 A | 4/2015 |
| CN | 104752734 A | 7/2015 |
| CN | 103515590 B | 9/2015 |
| CN | 105514373 A | 4/2016 |
| CN | 104772473 B | 9/2016 |
| CN | 106001597 A | 10/2016 |
| CN | 106159316 A | 11/2016 |
| CN | 106216703 A | 12/2016 |
| CN | 106450146 A | 2/2017 |
| CN | 106493350 A | 3/2017 |
| CN | 206040854 U | 3/2017 |
| CN | 106684387 A | 5/2017 |
| CN | 106756417 A | 5/2017 |
| CN | 106784692 A | 5/2017 |
| CN | 107093732 A | 8/2017 |
| CN | 107541633 A | 1/2018 |
| CN | 107579241 A | 1/2018 |
| CN | 107931622 A | 4/2018 |
| CN | 108134104 A | 6/2018 |
| CN | 108145170 A | 6/2018 |
| CN | 108217612 A | 6/2018 |
| CN | 108620597 A | 10/2018 |
| CN | 108649190 A | 10/2018 |
| CN | 108672709 A | 10/2018 |
| CN | 108907210 A | 11/2018 |
| CN | 108963239 A | 12/2018 |
| CN | 109167070 A | 1/2019 |
| CN | 109301212 A | 2/2019 |
| CN | 109616622 A | 4/2019 |
| CN | 109692965 A | 4/2019 |
| CN | 109742320 A | 5/2019 |
| CN | 109808049 A | 5/2019 |
| CN | 109888233 A | 6/2019 |
| CN | 110153434 A | 8/2019 |
| CN | 110218897 A | 9/2019 |
| CN | 110299516 A | 10/2019 |
| CN | 110790263 A | 2/2020 |
| CN | 110993908 A | 4/2020 |
| CN | 111099577 A | 5/2020 |
| CN | 111342163 A | 6/2020 |
| CN | 111370751 A | 7/2020 |
| CN | 111403701 A | 7/2020 |
| CN | 111515391 A | 8/2020 |
| CN | 111970807 A | 11/2020 |
| CN | 112259740 A | 1/2021 |
| CN | 112331947 A | 2/2021 |
| CN | 112397706 A | 2/2021 |
| CN | 112421006 A | 2/2021 |
| CN | 112421048 A | 2/2021 |
| CN | 112447977 A | 3/2021 |
| CN | 112768709 A | 5/2021 |
| CN | 112768710 A | 5/2021 |
| CN | 112768711 A | 5/2021 |
| CN | 112864453 A | 5/2021 |
| CN | 113097487 A | 7/2021 |
| CN | 113104838 A | 7/2021 |
| CN | 113764688 A | 12/2021 |

(56) References Cited

FOREIGN PATENT DOCUMENTS

| | | |
|---|---|---|
| CN | 113871581 A | 12/2021 |
| CN | 114388822 A | 4/2022 |
| CN | 114744315 A | 7/2022 |
| CN | 114824297 A | 7/2022 |
| CN | 115394976 A | 11/2022 |
| DE | 10335355 A1 | 11/2004 |
| DE | 102009033251 A1 | 9/2010 |
| DE | 102010006440 A1 | 8/2011 |
| DE | 102011109137 A1 | 2/2013 |
| DE | 102018132896 A1 | 6/2020 |
| EP | 0256233 A2 | 2/1988 |
| EP | 2292557 A1 | 3/2011 |
| EP | 3143838 A1 | 3/2017 |
| EP | 3474978 A1 | 5/2019 |
| FR | 2525122 A1 | 10/1983 |
| FR | 2591412 A1 | 6/1987 |
| GB | 2595745 A | 12/2021 |
| IN | 202011017775 | 10/2021 |
| JP | 63-243212 A | 10/1988 |
| JP | 10-172564 A | 6/1998 |
| JP | 11-064556 A | 3/1999 |
| JP | 2001-064703 A | 3/2001 |
| JP | 2001-504753 A | 4/2001 |
| JP | 2001-348296 A | 12/2001 |
| JP | 2002-121607 A | 4/2002 |
| JP | 2002-249836 A | 9/2002 |
| JP | 2002-332531 A | 11/2002 |
| JP | 2004-505761 A | 2/2004 |
| JP | 2004-193115 A | 7/2004 |
| JP | 2004-232084 A | 8/2004 |
| JP | 2004-311297 A | 11/2004 |
| JP | 2004-362895 A | 12/2004 |
| JP | 2005-015282 A | 1/2005 |
| JP | 2005-072015 A | 3/2005 |
| JP | 2005-076052 A | 3/2005 |
| JP | 2005-135755 A | 5/2005 |
| JP | 2005-187295 A | 7/2005 |
| JP | 2005-222956 A | 8/2005 |
| JP | 2005-272284 A | 10/2005 |
| JP | 2006-040722 A | 2/2006 |
| JP | 2007-113120 A | 5/2007 |
| JP | 2007-138287 A | 6/2007 |
| JP | 2007-149513 A | 6/2007 |
| JP | 2007-238402 A | 9/2007 |
| JP | 2008-230905 A | 10/2008 |
| JP | 2008-243447 A | 10/2008 |
| JP | 2009-187754 A | 8/2009 |
| JP | 2010-024506 A | 2/2010 |
| JP | 2010-097914 A | 4/2010 |
| JP | 2011-108406 A | 6/2011 |
| JP | 2011-222323 A | 11/2011 |
| JP | 2011-258348 A | 12/2011 |
| JP | 2012-046393 A | 3/2012 |
| JP | 2012-151052 A | 8/2012 |
| JP | 2013-062242 A | 4/2013 |
| JP | 2013-063539 A | 4/2013 |
| JP | 2013-076130 A | 4/2013 |
| JP | 2015-048269 A | 3/2015 |
| JP | 2015-122218 A | 7/2015 |
| JP | 2016-029193 A | 3/2016 |
| JP | 2016-047961 A | 4/2016 |
| JP | 6103499 B2 | 3/2017 |
| JP | 2017-524628 A | 8/2017 |
| JP | 2018-141762 A | 9/2018 |
| JP | 2018-528328 A | 9/2018 |
| JP | 2018-190563 A | 11/2018 |
| JP | 2019-516020 A | 6/2019 |
| JP | 2019-112699 A | 7/2019 |
| JP | 2020-121898 A | 8/2020 |
| JP | 2021-061089 A | 4/2021 |
| JP | 2021-061090 A | 4/2021 |
| JP | 2021-116191 A | 8/2021 |
| JP | 2022-530649 A | 6/2022 |
| KR | 10-2007-0076686 A | 7/2007 |
| KR | 10-2009-0070140 A | 7/2009 |
| KR | 10-1133094 B1 | 4/2012 |
| KR | 10-2017-0039922 A | 4/2017 |
| KR | 10-2017-0045181 A | 4/2017 |
| KR | 10-2018-0001799 A | 1/2018 |
| KR | 10-2018-0035750 A | 4/2018 |
| KR | 10-1907912 B1 | 10/2018 |
| KR | 10-1907916 B1 | 10/2018 |
| KR | 10-1923466 B1 | 11/2018 |
| KR | 10-2101006 B1 | 4/2020 |
| KR | 10-2124946 B1 | 6/2020 |
| KR | 10-2020-0131751 A | 11/2020 |
| KR | 10-2021-0057253 A | 5/2021 |
| RU | 2744449 C1 | 3/2021 |
| TW | 521539 B | 2/2003 |
| TW | 200823313 A | 6/2008 |
| TW | 1329143 B | 8/2010 |
| TW | 201411922 A | 3/2014 |
| TW | I593484 B | 8/2017 |
| WO | 03/77333 A1 | 9/2003 |
| WO | 2004/054017 A1 | 6/2004 |
| WO | 2004/089821 A1 | 10/2004 |
| WO | 2005/039752 A1 | 5/2005 |
| WO | 2006/100837 A1 | 9/2006 |
| WO | 2010/095726 A1 | 8/2010 |
| WO | 2011/082596 A1 | 7/2011 |
| WO | 2011/090779 A2 | 7/2011 |
| WO | 2012/023858 A1 | 2/2012 |
| WO | 2012/114108 A1 | 8/2012 |
| WO | 2012/144424 A1 | 10/2012 |
| WO | 2012/162743 A1 | 12/2012 |
| WO | 2013/017217 A1 | 2/2013 |
| WO | 2014/011239 A2 | 1/2014 |
| WO | 2014/110604 A2 | 7/2014 |
| WO | 2014/153318 A1 | 9/2014 |
| WO | 2015/064633 A1 | 5/2015 |
| WO | 2015/174949 A1 | 11/2015 |
| WO | 2016/048862 A1 | 3/2016 |
| WO | 2016/091957 A1 | 6/2016 |
| WO | 2017/074081 A1 | 5/2017 |
| WO | 2017/074084 A1 | 5/2017 |
| WO | 2017/080978 A1 | 5/2017 |
| WO | 2017/091543 A1 | 6/2017 |
| WO | 2017/106601 A8 | 7/2017 |
| WO | 2017/118955 A1 | 7/2017 |
| WO | 2017/130946 A1 | 8/2017 |
| WO | 2017/158349 A1 | 9/2017 |
| WO | 2017/177315 A1 | 10/2017 |
| WO | 2017/178841 A1 | 10/2017 |
| WO | 2017/223482 A1 | 12/2017 |
| WO | 2018/133429 A1 | 7/2018 |
| WO | 2018/141082 A1 | 8/2018 |
| WO | 2019/045923 A1 | 3/2019 |
| WO | 2019/052670 A1 | 3/2019 |
| WO | 2019/095039 A1 | 5/2019 |
| WO | 2019/124344 A1 | 6/2019 |
| WO | 2019/139773 A1 | 7/2019 |
| WO | 2019/178668 A1 | 9/2019 |
| WO | 2019/243870 A1 | 12/2019 |
| WO | 2019/246242 A1 | 12/2019 |
| WO | 2019/246257 A1 | 12/2019 |
| WO | 2020/009955 A1 | 1/2020 |
| WO | 2020/013667 A1 | 1/2020 |
| WO | 2020/041767 A1 | 2/2020 |
| WO | 2020/041775 A1 | 2/2020 |
| WO | 2020/091854 A1 | 5/2020 |
| WO | 2020/132343 A1 | 6/2020 |
| WO | 2020/223358 A1 | 11/2020 |
| WO | 2020/223374 A1 | 11/2020 |
| WO | 2021/029769 A1 | 2/2021 |
| WO | 2021/046249 A1 | 3/2021 |
| WO | 2021/085670 A1 | 5/2021 |
| WO | 2021/115596 A1 | 6/2021 |
| WO | 2021/118762 A1 | 6/2021 |
| WO | 2021/127132 A1 | 6/2021 |
| WO | 2021/191281 A1 | 9/2021 |
| WO | 2021/245410 A1 | 12/2021 |
| WO | 2021/245411 A1 | 12/2021 |
| WO | 2021/263273 A1 | 12/2021 |
| WO | 2022/005999 A1 | 1/2022 |

(56) References Cited

FOREIGN PATENT DOCUMENTS

| | | |
|---|---|---|
| WO | 2022/032301 A1 | 2/2022 |
| WO | 2022/043701 A1 | 3/2022 |
| WO | 2022/043702 A1 | 3/2022 |
| WO | 2022/043704 A1 | 3/2022 |
| WO | 2022/043705 A1 | 3/2022 |
| WO | 2022/067303 A1 | 3/2022 |
| WO | 2022/075846 A1 | 4/2022 |
| WO | 2022/107907 A1 | 5/2022 |
| WO | 2022/133585 A1 | 6/2022 |
| WO | 2022/136699 A1 | 6/2022 |

OTHER PUBLICATIONS

Nyutu, E. et al., "Ultrasonic Nozzle Spray in Situ Mixing and Microwave-Assisted Preparation of Nanocrystalline Spinel Metal Oxides: Nickel Ferrite and Zinc Aluminate", Journal of Physical Chemistry C, Feb. 1, 2008, vol. 112, No. 5, pp. 1407-1414.

Ohta, R. et al., "Effect of PS-PVD production throughput on Si nanoparticles for negative electrode of lithium ion batteries", Journal of Physics D: Applied Physics, Feb. 2018, vol. 51(1), in 7 pages.

Or, T. et al., "Recycling of mixed cathode lithium-ion batteries for electric vehicles: Current status and future outlook", Carbon Energy, Jan. 2020, vol. 2, pp. 6-43. URL: https://doi.org/10.1002/cey2.29.

Park et al. "Preparation of spherical WTaMoNbV refractory high entropy alloy powder by inductively-coupled thermal plasma", Materials Letters 255 (2019) 126513 {Year: 2019).

Popescu et al.. "New TiZrNbTaFe high entropy alloy used for medical applications" IOP Conference Series: Materials Science and Engineering 400. Mod Tech 2018 (2018), 9 pages.

Reig, L. et al., "Microstructure and Mechanical Behavior of Porous Ti—6Al—4V Processed by Spherical Powder Sintering", Materials, Oct. 23, 2013, vol. 6, pp. 4868-4878.

Sastry, S.M.L. et al., "Rapid Solidification Processing of Titanium Alloys", Journal of Metals (JOM), Sep. 1983, vol. 35, pp. 21-28.

Savage, S. J. et al., "Production of rapidly solidified metals and alloys", Journal of Metals (JOM), Apr. 1984, vol. 36, pp. 20-33.

Sheng, Y. et al., "Preparation of Micro-spherical Titanium Powder by RF Plasma", Rare Metal Materials and Engineering, Jun. 2013, vol. 42, No. 6, pp. 1291-1294.

Sheng, Y. et al., "Preparation of Spherical Tungsten Powder by RF Induction Plasma", Rare Metal Materials and Engineering, Nov. 2011, vol. 40, No. 11, pp. 2033-2037.

Suryanarayana, C. et al., "Rapid solidification processing of titanium alloys", International Materials Reviews, 1991, vol. 36, pp. 85-123.

Suryanarayana, C., "Recent Developments in Mechanical Alloying", Reviews on Advanced Materials Science, Aug. 2008, vol. 18(3), pp. 203-211.

Tang, H. P. et al., "Effect of Powder Reuse Times on Additive Manufacturing of Ti—6Al—4V by Selective Electron Beam Melting", JOM, Mar. 2015, vol. 67, pp. 555-563.

Van Laar, J. H. et al., "Spheroidisation of Iron Powder in a Microwave Plasma Reactor", Journal of the Southern African Institute of Mining and Metallurgy, Oct. 2016, vol. 116, No. 10, pp. 941-946.

Veith et al., "Low temperature synthesis of nanocrystalline Y3Al5O12 (YAG) and Cedoped Y3Al5O12 via different sol-gel methods." J. Mater Chem, (1999) 9: 3069-3079.

Walter et al., "Microstructural and mechanical characterization of sol gel-derived Si—O—C glasses" Journal of the European Ceramic Society, vol. 22, Issue 13, Dec. 2002, pp. 2389-2400.

Wang, J. et al., "Preparation of Spherical Tungsten and Titanium Powders by RF Induction Plasma Processing", Rare Metals, Jun. 2015 (published online May 31, 2014), vol. 34, No. 6, pp. 431-435.

Wang, Y. et al., "Developments in Nanostructured Cathode Materials for High-Performance Lithium-Ion Batteries", Advanced Materials, Jun. 2008, pp. 2251-2269.

Yang et al., "Preparation of Spherical Titanium Powders from Polygonal Titanium Hydride Powders by Radio Frequency Plasma Treatment" Materials Transactions, vol. 54, No. 12 (2013) pp. 2313 to 2316.

Zhang, K., Ph.D., "The Microstructure and Properties of Hipped Powder Ti Alloys", a thesis submitted to The University of Birmingham, College of Engineering and Physical Sciences, Apr. 2009, in 65 pages.

Zhang, X. et al., "High thickness tungsten coating with low oxygen content prepared by air plasma spray", Cailliao Gongcheng, 2014, vol. 5, pp. 23-28.

Zhang, Y. D. et al., "High-energy cathode materials for Li-ion batteries: A review of recent developments", Science China Technological Sciences, Sep. 2015, vol. 58(11), pp. 1809-1828.

Zhang, Y. et al., "Microstructures and properties of high-entropy alloys", Progress in Materials Science, Apr. 2014 (available online Nov. 2013), vol. 61, pp. 1-93.

Zhang, Y. S. et al., "Core-shell structured titanium-nitrogen alloys with high strength, high thermal stability and good plasticity", Scientific Reports, Jan. 2017, vol. 7, in 8 pages.

Zielinski, A et al., "Modeling and Analysis of a Dual-Channel Plasma Torch in Pulsed Mode Operation For Industrial, Space, and Launch Applications", IEEE Transactions on Plasma Science, Jul. 2015, vol. 43(7), pp. 2201-2206.

"Build Boldly", Technology Demonstration, 6K Additive, [publication date unknown], in 11 pages.

Ajayi, B. et al., "A rapid and scalable method for making mixed metal oxide alloys for enabling accelerated materials discovery", Journal of Materials Research, Jun. 2016, vol. 31, No. 11, pp. 1596-1607.

Ajayi, B. P. et al., "Atmospheric plasma spray pyrolysis of lithiated nickel-manganese-cobalt oxides for cathodes in lithium ion batteries", Chemical Engineering Science, vol. 174, Sep. 14, 2017, pp. 302-310.

Australian Office Action, re AU Application No. 2016370962, mailed May 29, 2020.

Bobzin, K. et al., "Modelling and Diagnostics of Multiple Cathodes Plasma Torch System for Plasma Spraying", Frontiers of Mechanical Engineering, Sep. 2011, vol. 6, pp. 324-331.

Bobzin, K. et al., "Numerical and Experimental Determination of Plasma Temperature during Air Plasma Spraying with a Multiple Cathodes Torch", Journal of Materials Processing Technology, Oct. 2011, vol. 211, pp. 1620-1628.

Boulos, M. I., "The inductively coupled radio frequency plasma." Journal of High Temperature Material Process, Jan. 1997, vol. 1, pp. 17-39.

Boulos, M., "Induction Plasma Processing of Materials for Powders, Coating, and Near-Net-Shape Parts", Advanced Materials & Processes, Aug. 2011, pp. 52-53, in 3 pages.

Boulos, M., "Plasma power can make better powders", Metal Powder Report, May 2004, vol. 59(5), pp. 16-21.

Carreon, H. et al., "Study of Aging Effects in a Ti—6AL—4V alloy with Widmanstatten and Equiaxed Microstructures by Non-destructive Means", AIP Conference Proceedings 1581, 2014 (published online Feb. 17, 2015), pp. 739-745.

Chang, S. et al., "One-Step Fast Synthesis of Li4Ti5O12 Particles Using an Atmospheric Pressure Plasma Jet", Journal of the American Ceramic Society, Dec. 26, 2013, vol. 97, No. 3, pp. 708-712.

Chen, G. et al., "Spherical Ti—6Al—4V Powders Produced by Gas Atomization", Key Engineering Materials, vol. 704, Aug. 2016, pp. 287-292. URL: https://www.scientific.net/KEM.704.287.

Chikumba et al., "High Entropy Alloys: Development and Applications" 7th International Conference on Latest Trends in Engineering & Technology (ICLTET'2015) Nov. 26-27, 2015 Irene, Pretoria (South Africa).

Chinese Office Action, re CN Application No. 201680082035.1, mailed Sep. 7, 2021.

Chinese Office Action, re CN Application No, 201680082035.1, mailed Sep. 2, 2020.

Chinese Office Action, re CN Application No. 201680082035.1, mailed Mar. 11, 2021.

(56) References Cited

OTHER PUBLICATIONS

Coldwell, D. M. et al., "The reduction of SiO.sub.2 with Carbon in a Plasma", Journal of Electrochemical Society, Jan. 1977, vol. 124, pp. 1686-1689.

Dearmitt, C., "26. Functional Fillers for Plastics", in Applied Plastics Engineering Handbook—Processing and Materials, ed., Myer Kuiz, Elsevier, 2011, pp. 455-468.

Dolbec, R., "Recycling Spherical Powders", Presented at Titanium 2015, Orlando, FL, Oct. 2015, in 20 pages.

European Office Action, re EP Application No. 16876747.3, mailed Jan. 26, 2021.

European Office Action, re EP Application No. 16876747.3, mailed Jun. 12, 2019.

European Office Action, re EP Application No. 16876747.3, mailed May 18, 2020.

European Office Action, re EP Application No. 16876747.3, mailed Sep. 8, 2021.

European Office Action, re EP Application No. 18923334.9, mailed Dec. 9, 2021.

Fuchs, G.E. et al., "Microstructural evaluation of as-solidified and heat-treated y-TiAl based powders", Materials Science and Engineering, 1992, A152, pp. 277-282.

Gleiman, S. et al., "Melting and spheroidization of hexagonal boron nitride in a microwave-powered, atmospheric pressure nitrogen plasma", Journal of Materials Science, Aug. 2002, vol. 37(16), pp. 3429-3440.

Gradl, P. et al., "GRCop-42 Development and Hot-fire Testing Using Additive Manufacturing Powder Bed Fusion for Channel-Cooled Combustion Chambers", 55th AIAA/SAE/ASEE Joint Propulsion Conference 2019, Auaust 2019, pp. 1-26.

He et al., "A precipitation-hardened high-entropy alloy with outstanding tensile properties" Acta Materialia 102, Jan. 2016, pp. 187-196.

Houmes et al., "Microwave Synthesis of Ternary Nitride Materials", Journal of Solid State Chemistry, vol. 130, Issue 2, May 1997, pp. 266-271.

International Preliminary Report on Patentability and Written Opinion, re PCT Application No. PCT/US2019/037979, mailed Dec. 30, 2020.

International Search Report and Written Opinion, re PCT Application No. PCT/2020/065536, mailed Mar. 5, 2021.

International Search Report and Written Opinion, re PCT Application No. PCT/IB2018/054523, mailed Nov. 2, 2018.

International Search Report and Written Opinion, re PCT Application No. PCT/US2016/067100, mailed Mar. 22, 2017.

International Search Report and Written Opinion, re PCT Application No. PCT/US2017/039049, mailed on Oct. 31, 2017.

International Search Report and Written Opinion, re PCT Application No. PCT/US2019/037956, mailed Oct. 1, 2019.

International Search Report and Written Opinion, re PCT Application No. PCT/US2019/037979, mailed Aug. 22, 2019.

Ivasishin, et al., "Innovative Process for Manufacturing Hydrogenated Titanium Powder for Solid State Production of R/M Titanium Alloy Components" Titanium 2010, Oct. 3-6, 2010, 27 pages.

Jia, H. et al., "Hierarchical porous silicon structures with extraordinary mechanical strength as high-performance lithium-ion battery anodes", Nature Communications, Mar. 2020, vol. 11, in 9 pages. URL: httos://doi.ora/10.1038/s41467-020-15217-9.

Ko, M. et al., "Challenges in Accommodating vol. Change of Si Anodes for Li-Ion Batteries", Chem Electro Chem, Aug. 2015, vol. 2, pp. 1645-1651. URL: https://doi.org/10.1002/celc.201500254.

Kotlyarov, V. I. et al., "Production of Spherical Powders on the Basis of Group IV Metals for Additive Manufacturing", Inorganic Materials: Applied Research, Pleiades Publishing, May 2017, vol. 8, No. 3, pp. 452-458.

Laine, R. M. et al., "Making nanosized oxide powders from precursors by flame spray pyrolysis", Key Engineering Materials, Jan. 1999, vol. 159-160, pp. 17-24.

Li, L. et al., "Spheroidization of silica powders by radio frequency inductively coupled plasma with Ar—H2 and Ar—N2 as the sheath gases at atmospheric pressure", International Journal of Minerals, Metallurgy, and Materials, Sep. 2017, vol. 24(9), pp. 1067-1074.

Li, X. et al., "Mesoporous silicon sponge as an anti-pulverization structure for high-performance lithium-ion battery anodes", Nature Communications, Jul. 2014, vol. 5, Article No. 4105, in 7 pages. URL: httDs://doi.org/10.1038/ncomms5105.

Li, Z. et al., "Strong and Ductile Non-Equiatomic High-Entropy Alloys: Design, Processing, Microstructure, and Mechanical Properties", The Journal of the Minerals, Metals & Materials Society, Aug. 2017, vol. 69(1), pp. 2099-2106. URL: https://doi.org/10.1007/s11837-017-254Q-2.

Lin, M., "Gas Quenching with Air Products' Rapid Gas Quenching Gas Mixture", Air Products, Dec. 31, 2007, in 4 pages. URL: https://www.airproducts.co.uk/-/media/airproducts/files/en/330/330-07-085-us-gas-quenching-with-air-products-rapid-gas-quenching-gas-mixture.pdf.

Majewksi, T., "Investigation of W—Re—Ni heavy alloys produced from plasma spheroidized powders", Solid State Phenomena, Mar. 2013, vol. 199, pp. 448-453.

Moisan, M. et al., "Waveguide-Based Single and Multipie Nozzle Plasma Torches: the Tiago Concept", Plasma Sources Science and Technology, Jun. 2001, vol. 10, pp. 387-394.

Moldover, M. R. et al., "Measurement of the Universal Gas Constant R Using a Spherical Acoustic Resonator", Physical Review Letters, Jan. 1988, vol. 60(4), pp. 249-252.

Muoto, C. et al., "Phase Homogeneity in Y2O3—MgO Nanocomposites Synthesized by Thermal Decomposition of Nitrate Precursors with Ammonium Acetate Additions" J. Am. Ceram. Soc., 94[12] 4207-4217, 2011.

Murugan et al. "Nanostructured a/ß-tungsten by reduction of WO3 under microwave plasma", Int. Journal of Refractory Metals and Hard Materials 29 (2011) 128-133. (Year: 2011).

"High-entropy alloy", Wikipedia, webpage last edited Dec. 29, 2022 (accessed Jan. 17, 2023), in 16 pages. URL: https://en.wikipedia.org/wiki/High-entropy_alloy.

Ali, My., et al., Spray Flame Synthesis (SFS) of Lihium Lanrthaum Zirconate (LLZO) Solid Electroly, Materials, vol. 14, No. 13, 2021, pp. 1-13.

Barbis et al., "Titanium powders from the hydride-dehydride process." Titanium Powder Metallurgy. Butterworth-Heinemann, 2015. pp. 101-116.

Bardos, L., et al., "Differences between microwave and RF activation of nitrogen for the PECVD process", J. Phys. D: Appl. Phys., vol. 15, 1982, pp. 79-82.

Bardos, L., et al., "Microwave Plasma Sources and Methods in Processing Technology", IEEE Press, 2022, 10 pages.

Canadian Office Action, re CA Application No. 3009630 mailed Oct. 19, 2022.

Choi, S. I., et al., "Continuous process of carbon nanotubes synthesis by decomposition of methane using an arc-jet plasma", Thin Solid Films, 2006, vol. 506-507, 2006, pp. 244-249.

Collin, J. E., et al., "Ionization of methane and it's electronic energy levels", Canadian Journal of Chemistry, 2011, vol. 45, No. 16, pp. 1875-1882.

Decker, J., et al., "Sample preparation protocols for realization of reproducible characterization of single-wall carbon nanotubes", Metrologia, 2009, vol. 46, No. 6, pp. 682-692.

Ding, F., et al., "Nucleation and Growth of Single-Walled Carbon Nanotubes: A Molecular Dynamics Study", J. Phys. Chem. B, vol. 108, 2004, pp. 17369-17377.

Ding, F., et al., "The Importance of Strong Carbon-Metal Adhesion for Catalytic Nucleation of Single-Walled Carbon Nanotubes", Nano Letters, 2008, vol. 8, No. 2, pp. 463-468.

Dors, M., et al., "Chemical Kinetics of Methane Pyrolysis in Microwave Plasma at Atmospheric Pressure", Plasma Chem Plasma Process, 2013, vol. 34, No. 2, pp. 313-326.

Eremin, A., et al., "The Role of Methyl Radical in Soot Formation", Combustion Science and Technology, vol. 191, No. 12, 2008, pp. 2226-2242.

European Office Action, re EP Application No. 19735153.9, dated Dec. 12, 2022, 11 pages.

European Office Action, re EP Application No. 19740115, dated Mar. 2, 2023, 6 pages.

(56) References Cited

OTHER PUBLICATIONS

Finckle, J. R., et al., "Plasma Pyrolysis of Methane to Hydrogen and Carbon Black", Industrial Engineering and Chemical Research, 2002. vol. 41, No. 6, 2002, pp. 1425-1435.

Fu, D., et al., "Direct synthesis of Y-junction carbon nanotubes by microwave-assisted pyrolysis of methane", Materials Chemistry and Physics, vol. 118, vol. 2-3, 2009, pp. 501-505.

Grace, J. et al., "Connecting particle sphericity and circularity", Particuology, vol. 54, 2021, pp. 1-4, ISSN 1674-2001, https://doi.org/10.1016/j.partic.2020.09.006. (Year: 2020).

Haghighatpanah, S., et al., "Computational studies of catalyst-free single walled carbon nanotube growth", J Chem Phys, vol. 139, No. 5, 10 pages.

Haneklaus, N., et al., "Stop Smoking—Tube-in-Tube Helical System for Flameless Calcination of Minerals," Processes, vol. 5, No. 4, Nov. 3, 2017, pp. 1-12.

Huo, H., et al., "Composite electrolytes of polyethylene oxides/garnets interfacially wetted by ionic liquid for room-temperature solid-state lithium battery", Journal of Power Sources, vol. 372, 2017, pp. 1-7.

Irle, S., et al., "Milestones in molecular dynamics simulations of single-walled carbon nanotube formation: A brief critical review", Nano Research, 2009, vol. 2, No. 10, pp. 755-767.

Japanese Office Action, re JP Application No. 2022-537613, dated Apr. 18, 2023, 9 pages.

Jasek, O., et al., "Microwave plasma-based high temperature dehydrogenation of hydrocarbons and alcohols as a single route to highly efficient gas phase synthesis of freestanding graphene", Nanotechnology, 2021, vol. 32, 11 pages.

Jasinski, M., et al., "Atmospheric pressure microwave plasma source for hydrogen production", International Journal of Hydrogen Energy, vol. 38, Issue 26, 2013, pp. 11473-11483.

Jasinski, M., et al., "Hydrogen production via methane reforming using various microwave plasma sources", Chem. Listy, 2008, vol. 102, pp. s1332-s1337.

Kassel, L. S., "The Thermal Decomposition of Methane", Journal of the American Chemical Society, vol. 54, No. 10, 1932, pp. 3949-3961.

Kerscher, F., et al., "Low-carbon hydrogen production via electron beam plasma methane pyrolysis: Techno-economic analysis and carbon footprint assessment", International Journal of Hydrogen Energy, vol. 46, Issue 38, 2021, pp. 19897-19912.

Kim, K. S., et al., "Synthesis of single-walled carbon nanotubes by induction thermal plasma", Nano Research, 2009, vol. 2, No. 10, pp. 800-817.

Kumal, R. R., et al., "Microwave Plasma Formation of Nanographene and Graphitic Carbon Black", C, 2020, vol. 6, No. 4, 10 pages.

Lee, D. H., et al., "Comparative Study of Methane Activation Process by Different Plasma Sources", Plasma Chem. Plasma Process., vol. 33, No. 4, 2013, pp. 647-661.

Lee, D. H., et al., "Mapping Plasma Chemistry in Hydrocarbon Fuel Processing Processes", Plasma Chem. Plasma Process., vol. 33, No. 1, 2013, pp. 249-269.

Liu, Y., et al., "Advances of microwave plasma-enhanced chemical vapor deposition in fabrication of carbon nanotubes: a review", J Mater Sci., vol. 55, 2021, pp. 12559-12583.

Olsvik, O., et al., "Thermal Coupling of Methane—A Comparison Between Kinetic Model Data and Experimental Data", Thermochimica Acta., vol. 232, No. 1, 1994, pp. 155-169.

Pulsation Reactors—Thermal Processing for Extraordinary Material Properties, retrieved from https://www.ibu-tec.com/facilities/pulsation-reactors/, retrieved on Mar. 18, 2023, pp. 5.

Seehra, M. S., et al., "Correlation between X-ray diffraction and Raman spectra of 16 commercial graphene-based materials and their resulting classification", Carbon N Y., 2017, vol. 111, pp. 380-384.

Wang, H., et al., "A detailed kinetic modeling study of aromatics formation in laminar premixed acetylene and ethylene flames" Combustion and Flame, vol. 110, No. 1-2, 1997, pp. 173-221.

Zavilopulo, A. N., et al., "Ionization and Dissociative Ionization of Methane Molecules", Technical Physics, vol. 58, No. 9, 2013, pp. 1251-1257.

Zeng, X., et al., "Growth and morphology of carbon nanostructures by microwave-assisted pyrolysis of methane", Physica E., vol. 42, No. 8, 2010, pp. 2103-2108.

Zhang, H., et al., "Plasma activation of methane for hydrogen production in a N2 rotating gliding arc warm plasma: A chemical kinetics study", Chemical Engineering Journal, vol. 345, 2018, pp. 67-78.

Zhang, J., et al., "Flexible and ion-conducting membrane electrolytes for solid-state lithium batteries: Dispersion of garnet nanoparticles in insulating polyethylene oxide", Nano Energy, vol. 28, 2016, pp. 447-454.

Zhong, R., et al., "Continuous preparation and formation mechanism of few-layer graphene by gliding arc plasma", Chemical Engineering Journal, vol. 387, 2020, 10 pages.

6K, "6K Launches World's First Premium Metal Powders for Additive Manufacturing Derived From Sustainable Sources", Cision PR Newswire, Nov. 4, 2019, in 1 page. URL: https://www.prnewswire.com/news-releases/6k-launches-worlds-first-premium-metal-powders-for-additive-manufacturing-derived-from-sustainable-sources-300950791.html.

Australian Notice of Allowance, re AU Application No. 2023203146, dated Jun. 16, 2023, 3 pages.

Chau, J. L. K. et al. "Microwave Plasma Production of Metal Nanopowders," Jun. 12, 2014, Inorganics, vol. 2, pp. 278-290 (Year: 2014).

Colombini, E., et al., "High entropy alloys obtained by field assisted powder metallurgy route: SPS and microwave heating", Materials Chemistry and Physics, vol. 210, May 1, 2018, pp. 78-86.

Fang, S., et al., "Microstructure and mechanical properties of twinned Al0.5CrFeNiCo0.3C0.2 high entropy alloy processed by mechanical alloying and spark plasma sintering", Materials & Design, vol. 54, 2014, pp. 973-979.

Sabat, K.C., "Hydrogen Plasma—Thermodynamics", Journal of Physics: Conference Series, 2019, International Conference on Applied Physics, Powder and Material Science, in 6 pages.

Schmidt-Ott, K., "Plasma-Reduction: Its Potential for Use in the Conservation of Metals", Proceedings of Metal 2004, Oct. 2004, pp. 235-246.

Taylor, G., et al.; "Reduction of Metal Oxides by Hydrogen", 1930, vol. 52 (Year: 1930).

Thierry, "Hydrogen (H2) Plasma", Thierry Corp., retrieved from internet on Feb. 15, 2024, in 2 pages. URL: https://www.thierry-corp.com/plasma-knowledgebase/hydrogen-h2-plasma.

Yang, P., et al., "Electromagnetic wave absorption properties of mechanically alloyed FeCoNiCrAl high entropy alloy powders", Advanced Powder Technology, vol. 27, No. 4, 2016, pp. 1128-1133.

Zhao Jing et al., Introduction to Materials Science, China Light Industry Press, Jun. 2013, 2nd edition, 1st printing, p. 61.

Zhu, H. et al., "Study on behaviors of tungsten powders in radio frequency thermal plasma", International Journal of Refractory Metals and Hard Materials, vol. 66, Aug. 2017, pp. 76-82.

\* cited by examiner

PROCESS FOR PRODUCING SPHEROIDIZED POWDER FROM FEEDSTOCK MATERIALS

INCORPORATION BY REFERENCE TO ANY PRIORITY APPLICATIONS

This application is a continuation of U.S. application Ser. No. 17/102,244, filed on Nov. 23, 2020, entitled "PROCESS FOR PRODUCING SPHEROIDIZED POWDER FROM FEEDSTOCK MATERIALS," now U.S. Pat. No. 11,465,201, issued Oct. 11, 2022, which is a continuation of U.S. application Ser. No. 16/827,322, filed on Mar. 23, 2020, entitled "PROCESS FOR PRODUCING SPHEROIDIZED POWDER FROM FEEDSTOCK MATERIALS," now U.S. Pat. No. 11,273,491, issued Mar. 15, 2022, which is a continuation of U.S. application Ser. No. 16/446,445 filed on Jun. 19, 2019, entitled "PROCESS FOR PRODUCING SPHEROIDIZED POWDER FROM FEEDSTOCK MATERIALS," now U.S. Pat. No. 10,639,712, issued May 5, 2020, which claims the priority benefit of U.S. Provisional Patent Application Ser. No. 62/687,109 entitled "METHODS FOR PRODUCING SPHEROIDIZED POWDER FROM A DEHYDROGENATED OR NON-HYDROGENATED FEED MATERIAL," filed on Jun. 19, 2018, U.S. Provisional Patent Application Ser. No. 62/687,094 entitled "Process for Recycling Used Powder to Produce Spheroidized Powder," filed on Jun. 19, 2018, and U.S. Provisional Patent Application Ser. No. 62/687,079 entitled "Process for Reusing Scrap Metal or Used Metal Parts for Producing Spheroidized Powder," filed on Jun. 19, 2018, the contents of each of which are hereby incorporated by reference in their entireties.

BACKGROUND

Field

The present disclosure is generally directed in some embodiments towards producing metal spherical or spheroidal powder products from feedstock materials including from scrap materials, dehydrogenated or non-hydrogenated materials, or recycled used powder.

Description of the Related Art

An important aspect of preparing some forms of industrial powders is the spheroidization process, which transforms irregularly shaped or angular powders produced by conventional crushing methods, into spherical low-porosity particles. Spherical powders are homogenous in shape, denser, less porous, have a high and consistent flowability, and high tap density. Such powders exhibit superior properties in applications such as injection molding, thermal spray coatings, additive manufacturing, etc.

Creating spheroidal metallic powders, especially metallic powders containing Ti, can pose a number of challenges. Achieving the desired spheroidal shape, the desired level of porosity (e.g., no porosity to very porous, and the desired composition and microstructure can be difficult.

Conventional spheroidization methods employ thermal arc plasma described in U.S. Pat. No. 4,076,640 issued Feb. 28, 1978 and radio-frequency generated plasma described in U.S. Pat. No. 6,919,527 issued Jul. 19, 2005. However, these two methods present limitations inherent to the thermal non-uniformity of radio-frequency and thermal arc plasmas.

In the case of thermal arc plasma, an electric arc is produced between two electrodes generates a plasma within a plasma channel. The plasma is blown out of the plasma channel using plasma gas. Powder is injected from the side, either perpendicularly or at an angle, into the plasma plume, where it is melted by the high temperature of the plasma. Surface tension of the melt pulls it into a spherical shape, then it is cooled, solidified and is collected in filters. An issue with thermal arc plasma is that the electrodes used to ignite the plasma are exposed to the high temperature causing degradation of the electrodes, which contaminates the plasma plume and process material. In addition, thermal arc plasma plume inherently exhibit large temperature gradient. By injecting powder into the plasma plume from the side, not all powder particles are exposed to the same process temperature, resulting in a powder that is partially spheroidized, non-uniform, with non-homogeneous porosity.

In the case of radio-frequency inductively coupled plasma spheroidization, the plasma is produced by a varying magnetic field that induces an electric field in the plasma gas, which in turn drives the plasma processes such as ionization, excitation, etc to sustain the plasma in cylindrical dielectric tube. Inductively coupled plasmas are known to have low coupling efficiency of the radio frequency energy into the plasma and a lower plasma temperature compared to arc and microwave generated plasmas. The magnetic field responsible for generating the plasma exhibits a non-uniform profile, which leads to a plasma with a large temperature gradient, where the plasma takes a donut-like shape that exhibiting the highest temperature at the edge of the plasma (close to the dielectric tube walls) and the lowest temperature in the center of the donut. In addition, there is a capacitive component created between the plasma and the radio frequency coils that are wrapped around the dielectric tube due to the RF voltage on the coils. This capacitive component creates a large electric field that drives ions from the plasma towards the dielectric inner walls, which in turn leads to arcing and dielectric tube degradation and process material contamination by the tube's material.

To be useful in additive manufacturing or powdered metallurgy (PM) applications that require high powder flow, metal powder particles should exhibit a spherical shape, which can be achieved through the process of spheroidization. This process involves the melting of particles in a hot environment whereby surface tension of the liquid metal shapes each particle into a spherical geometry, followed by cooling and re-solidification. Also, spherical powders can be directly produced by various techniques. In one such technique, a plasma rotating electrode (PRP) produces high flowing and packing titanium and titanium alloy powders but is deemed too expensive. Also, spheroidized titanium and titanium alloys have been produced using gas atomization, which uses a relatively complicated set up and may introduce porosity to the powder. Spheroidization methods of irregular shape powders include TEKNA's (Sherbrook, Quebec, Canada) spheroidization process using inductively coupled plasma (ICP), where angular powder obtained from Hydride-Dehydride (HDH) process is entrained within a gas and injected through a hot plasma environment to melt the powder particles. However, this method suffers from non-uniformity of the plasma, which leads to incomplete spheroidization of feedstock. The HDH process involves several complex steps, including hydrogenation dehydrogenation, and deoxydation before the powder is submitted to spheroidization. This process is a time consuming multi-step process, which drives up the cost of metal powders made through these methods.

SUMMARY

Disclosed herein are embodiments of a method for manufacturing a spheroidized powder from scrap metal or used metal parts, the method comprising: providing scrap metal or used metal parts comprising a material selected from the group consisting of metal, metal alloy, titanium, titanium alloy, nickel, nickel alloy, cobalt, cobalt alloy, steel, and steel alloy; milling the scrap metal or used metal parts to produce metallic particles within a range of particle volumes pre-determined to be suitable for use as feedstock in a microwave plasma process; and applying the microwave plasma process to the metallic particles within the determined range of particle volumes to form spheroidized powder.

In some embodiments, the determined range of particle volumes can be between 15 and 63 microns. In some embodiments, the scrap metal or used metal parts can comprise a work hardened microstructure that is retained in the spheroidized powder after applying the microwave plasma process. In some embodiments milling the scrap metal or used metal parts can be done without embrittling the scrap metal or used metal parts.

In some embodiments, the scrap metal or used metal parts can comprise Ti 6Al-4V. In some embodiments the scrap metal or used metal parts can comprise alloy elements including Al, Mg, Ti, and/or Cu and, after applying the microwave plasma process the spheroidized powder still includes the Al, Mg, Ti, and/or Cu. In some embodiments, the scrap metal or used metal parts can comprise sharp turnings, saw swarfs, grinding swarfs, grinding fines, and/or wash line fines. In some embodiments, the scrap metal or used metal parts can be selected for the milling to have a size and/or aspect ratio that will result post-milling in metallic particles within the pre-determined range of particle volumes.

Further disclosed herein are embodiments of a method for manufacturing a spheroidized powder having a desired particle size distribution between about x and about y, wherein x represents a low end of the particle size distribution and y represents a high end of the particle size distribution, the method comprising: introducing metallic particles obtained by milling or crushing scrap metal or used metal parts into a microwave plasma torch, a majority of said introduced metallic particles having a volume between about $4/3\pi(x/2)^3$ and about $4/3\pi(y/2)^3$, and wherein said introduced metallic particles have a collective average or median aspect ratio between 2:1 and 200:1; and melting and spheroidizing the metallic particles within the microwave plasma torch to form spheroidized powder having the desired particle size distribution of about x to about y.

In some embodiments x can equal 5 microns and y can equal 45 microns and the majority of said introduced metallic particles can have a volume between about 65.45 $\mu m^3$ and about 47,712.94 $\mu m^3$. In some embodiments, the collective average or median aspect ratio can be between 5:1 to 20:1. In some embodiments, the collective average or median aspect ratio can be between 10:1 to 100:1. In some embodiments, the introducing metallic particles into the microwave plasma torch can comprise introducing the metallic particles into an exhaust of the microwave plasma torch or into a plume of the microwave plasma torch.

Further disclosed herein are embodiments of a method for manufacturing a spheroidized powder from scrap metal or used metal parts, the method comprising: introducing metallic particles obtained by milling or crushing scrap metal or used metal parts into a microwave plasma torch; and melting and spheroidizing the metallic particles within the microwave plasma torch to form spheroidized powder.

In some embodiments, the milled or crushed particles can have a desired particle size distribution. In some embodiments, the desired particle size distribution can be 15 to 63 microns. In some embodiments, the milled or crushed particles can have a desired range of particle volumes. In some embodiments, the particles can be milled or crushed without embrittling the scrap metal or used metal parts. In some embodiments, milling or crushing the scrap metal or used metal parts can be used to produce the metallic particles.

In some embodiments, the scrap metal or used metal parts can comprise titanium or titanium alloy. In some embodiments, the scrap metal or used metal parts can comprise nickel or nickel alloy. In some embodiments, the scrap metal or used metal parts can comprise cobalt or cobalt alloy. In some embodiments, the scrap metal or used metal parts can comprise steel or steel alloy. In some embodiments, the scrap metal or used metal parts can comprise a ductile metal or metal alloy.

In some embodiments, the metallic particles can comprise milled turnings resulting from subtractive manufacturing. In some embodiments, the scrap metal or used metal parts can comprise sharp turnings, saw swarfs, grinding swarfs, grinding fines, and/or wash line fines. In some embodiments, the metallic particles can comprise a work hardened microstructure that is at least partially retained after the melting and spheroidizing. In some embodiments, the metallic particles can be only partially surface melted.

Further disclosed herein are embodiments of a method for manufacturing a spheroidized powder from scrap metal or used metal parts, the method comprising: providing scrap metal or used metal parts comprising titanium, titanium alloy or other ductile metal or ductile metal alloy; milling the scrap metal or used metal parts to produce metallic particles within a range of particle volumes pre-determined to be suitable for use as feedstock in a microwave plasma process, wherein the scrap metal or used metal parts are selected for the milling to have a size and/or aspect ratio that will result post-milling in metallic particles within the pre-determined range of particle volumes, wherein the milling occurs without embrittling the scrap metal or used metal parts; and applying the microwave plasma process to the metallic particles within the determined range of particle volumes to form spheroidized powder.

In some embodiments, the method can further comprise selecting portions of the scrap metal or used metal parts having a size and/or aspect ratio suitable for milling to the determined range of particle volumes. In some embodiments, the determined range of particle volumes can be between 15 and 63 microns. In some embodiments, the scrap metal or used metal parts comprise a work hardened microstructure that is retained in the spheroidized powder after applying the microwave plasma process.

In some embodiments, the milling can be performed in water. In some embodiments, the method can further comprise processing the spheroidized powder in an additive manufacturing process. In some embodiments, the method can further comprise milling the scrap metal or used metal parts without embrittling the scrap metal or used metal parts by hydrogenation or applying cryogenics. In some embodiments, the scrap metal or used metal parts can comprise turnings resulting from subtractive manufacturing.

In some embodiments, the scrap metal or used metal parts can comprise Ti-6-4. In some embodiments, the spheroidized powder resulting from the processes above.

Also disclosed herein are embodiments of a method of laser bed fusion, comprising using the spheroidized powder resulting from one or more features of the description above.

Also disclosed herein are embodiments of a method of electron beam manufacturing, comprising using the spheroidized powder resulting from one or more features of the description above.

Also disclosed herein are embodiments of a method of metal injection molding, comprising using the spheroidized powder resulting from one or more features of the description above.

Further disclosed herein are embodiments of a method for manufacturing a spheroidized powder from scrap metal or used metal parts, the method comprising: providing scrap metal or used metal parts; milling the scrap metal or used metal parts to produce metallic particles within a range of particle volumes pre-determined to be suitable for use as feedstock in a microwave plasma process, wherein the scrap metal or used metal parts are selected for the milling to have a size and/or aspect ratio that will result post-milling in metallic particles within the pre-determined range of particle volumes, wherein the milling occurs without embrittling the scrap metal or used metal parts; and applying the microwave plasma process to the metallic particles within the determined range of particle volumes to form spheroidized powder.

Also disclosed herein are embodiments of a spheroidized powder manufactured according to the methods described above.

Further disclosed herein are embodiments of a method for manufacturing a spheroidized powder from used powder, the method comprising: introducing previously used powder particles into a microwave plasma torch; and melting and spheroidizing the previously used powder particles within the microwave plasma torch to form spheroidized powder particles.

In some embodiments, the previously used powder particles can have a desired particle size distribution. In some embodiments, the previously used powder particles can comprise satellites, wherein the satellites can be removed during the melting and spheroidizing. In some embodiments, the previously used powder particles can comprise agglomerations, wherein the agglomerations can be removed during the melting and spheroidizing. In some embodiments, the previously used powder particles can comprise contaminants, wherein the contaminants can be removed during the melting and spheroidizing.

In some embodiments, the previously used powder particles can comprise metal or metal alloys. In some embodiments, the previously used powder particles can comprise titanium or titanium alloy. In some embodiments, the previously used powder particles can comprise nickel or nickel alloy. In some embodiments, the previously used powder particles can comprise a ductile metal or metal alloy. In some embodiments, the previously used powder particles can comprise cobalt or cobalt alloy. In some embodiments, the previously used powder particles can comprise steel and steel alloy. In some embodiments, the previously used powder particles can comprise a ceramic.

In some embodiments, the melting and spheroidizing can improve flowability of the previously used powder particles. In some embodiments, the melting and spheroidizing can increase density of the previously used powder particles. In some embodiments, carbon, nitrogen and/or other contaminants can be removed from the previously used powder particles during the melting and spheroidizing.

In some embodiments, a noble gas, argon gas, a mixture of argon gas and hydrogen gas, or nitrogen gas can be used during the melting and spheroidizing. In some embodiments, the previously used powder particles can be formed from an additive manufacturing process. In some embodiments, the additive manufacturing process can comprise laser sintering, electron-beam melting, filament fused deposition, directed energy deposition, powder bed fusion, or binder jetting.

In some embodiments, the spheroidized powder particles can retain the same rheological properties as the previously used powder particles after the melting and spheroidizing. In some embodiments, alloy component chemistry and/or minor component chemistry being less than 10 wt % can be the same in the spheroidized powder particles as the previously used powder particles. In some embodiments, the previously used powder particles can substantially only comprise particles that are not spheroidal. In some embodiments, the previously used powder particles can substantially only comprise particles that have satellites, contaminants, and/or agglomerations. In some embodiments, the previously used powder particles can comprise particles that are not spheroidal and particles that are spheroidal without having any satellites, contaminants, and/or agglomerations.

Further disclosed herein are embodiments of a method for producing a spheroidized powder from a feed material comprising dehydrogenated or non-hydrogenated titanium or titanium alloy, the method comprising: introducing a feed material comprising dehydrogenated or non-hydrogenated titanium or titanium alloy particles into a microwave plasma torch; and melting and spheroidizing the particles within a plasma generated by the microwave plasma torch to form spheroidized powder.

In some embodiments, the feed material can comprise titanium or titanium alloy particles processed by the hydrogenation-dehydrogenation (HDH) process. In some embodiments, the spheroidized powder can comprise particles with a median sphericity of at least 0.75. In some embodiments, the spheroidized powder can comprise particles with a median sphericity of at least 0.91. In some embodiments, the spheroidized powder can have a particle size distribution of 15 to 45 microns. In some embodiments, the spheroidized powder can have a particle size distribution of 45 to 105 microns.

In some embodiments, the method can further comprise exposing the spheroidized particles to an inert gas. In some embodiments, the method can further comprise setting one or more cooling processing variables to tailor the microstructure of the spheroidized particles. In some embodiments, setting one or more cooling processing variables can comprise selecting and controlling a cooling gas flow rate. In some embodiments, setting one or more cooling processing variables can comprise selecting and controlling a residence time of the particles of feed materials within the plasma. In some embodiments, setting one or more cooling processing variables can comprise selecting and controlling a cooling gas composition. In some embodiments, the cooling gas composition can be selected to provide high thermal conductivity.

In some embodiments, one or more cooling processing variables can be set to create a martensitic microstructure in the spheroidized particles. In some embodiments, one or more cooling processing variables can be set to create a Widmanstätten microstructure in the spheroidized particles. In some embodiments, one or more cooling processing variables can be set to create an equiaxed microstructure in the spheroidized particles. In some embodiments, one or more cooling processing variables can be set to create at least two regions, each region having a different microstructure. In some embodiments, the at least two regions can include a core portion and a skin portion. In some embodiments, the skin portion can have a microstructure that is different from the feed material's microstructure.

In some embodiments, melting and spheroidizing of the particles can occur within a substantially uniform temperature profile between about 4,000K and 8,000K. In some embodiments, the feed material can have a particle size of no less than 1.0 microns and no more than 300 microns. In some embodiments, the feed material can comprise Ti-6-4, and the melting and spheroidizing can be controlled such that the spheroidized powder comprises Ti-6-4.

Also disclosed herein are embodiments of a spheroidized powder manufactured according to the methods disclosed above.

DETAILED DESCRIPTION

Figure 1:
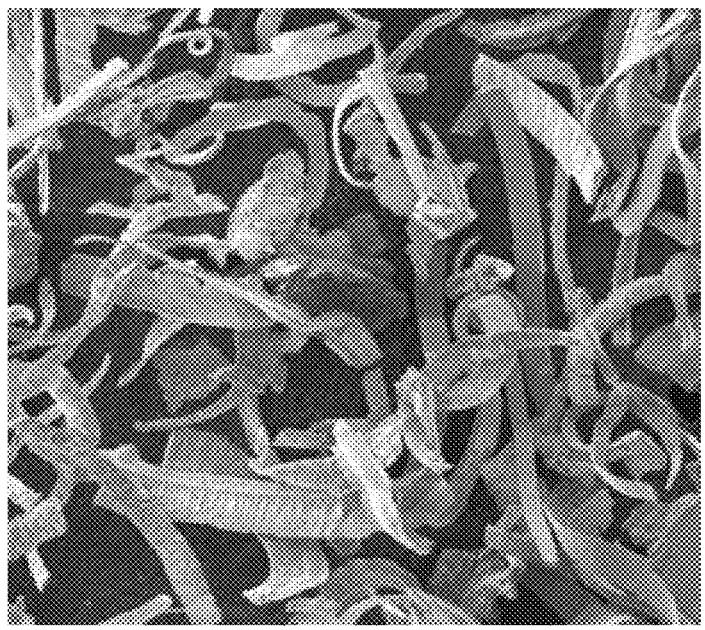
FIG. 1 illustrates an example embodiment of scrap metal feedstock in the form of metal turnings before microwave plasma processing according to the present disclosure.

Disclosed herein are embodiments of methods, devices, and assemblies for spheroidization of feedstock materials using microwave plasma processing. Each different feedstock material has its own critical, specialized, and unique requirements for the initial feedstock as well as the processing in a microwave plasma torch in order to achieve a desired spheroidization. Specifically, the feedstock materials disclosed herein pertain to scrap materials, dehydrogenated or non-hydrogenated feed material, and recycled used powder, the feedstocks which may require initial pre-processing or specific plasma processing. As disclosed herein, processing in a microwave plasma torch can include feeding the feedstock into a microwave plasma torch, a plasma plume of the microwave plasma torch, and/or an exhaust of the microwave plasma torch. The location may vary depending on the type of feedstock used. Further the feedstock can be selected based on different requirements. Examples of requirements are aspect ratio, particle size distribution (PSD), chemistry, density, diameter, sphericity, oxygenation, hardness, and ductility.

Scrap Materials

Disclosed herein are embodiments of methods, devices, and assemblies for reusing scrap metals/alloys and/or used parts made from metals/alloys (e.g., grave-to-cradle or scrap to premium). In particular, embodiments of the disclosure allow for taking metallic scrap or used metal parts, such as turnings, and without embrittling (such as through the use of hydrogenation or cryogenics) creating a feedstock for a microwave plasma process. Specifically, scrap or used metal parts can be milled to a desired volume of particles of a feedstock or turnings, though in some embodiments may not be milled. The feedstock or turnings can then be used as a feedstock for a microwave plasma process to form a final spheroidized powder, which can then be used in different processes, such as additive manufacturing processes. However, scrap material is extremely difficult to process into a proper feedstock for microwave plasma processing.

In some embodiments the method can include an analysis of the inter-relationship between 1) selection of feedstock size/aspect ratio, 2) a milling approach that breaks up ductile pieces without embrittling steps, and 3) a final desired particle volume, in order to create a desired particle size distribution for specific applications. In some embodiments, the feedstock is embrittled before milling. A user can specify a desired particle volume for the milling of the original scrap, which will influence the selection of the feedstock size/aspect ratio and the milling approach utilized.

The final specific application can be, for example, laser bed fusion which has a particle size distribution (PSD) of 15-45 microns (or about 15 to about 45 microns), or 15-63 microns (or about 15 to about 63 microns) or 20-63 microns (or about 20-about 63 microns), electron beam processing which can have a particle size distribution of 45-105 microns (or about 45 to about 105 microns) or 105-150 microns (or about 105 to about 150 microns), or metal injection molding (MIM). In some embodiments, the PSD can be expressed as the D50 of the particles in the feedstock. In some embodiments, the feedstock is processed through jet milling, wet milling, or ball milling. In some embodiments, the PSD of the feedstock is 15-15 microns, 15-45 microns, 20-63 microns, 45-105 microns, or 105 to 150 microns. The PSD can be adjusted depending on the powder processing technology such as laser powder bed fusion, direct energy deposition, binder jet printing, metal injection molding, and hot isostatic pressing.

Figure 2:
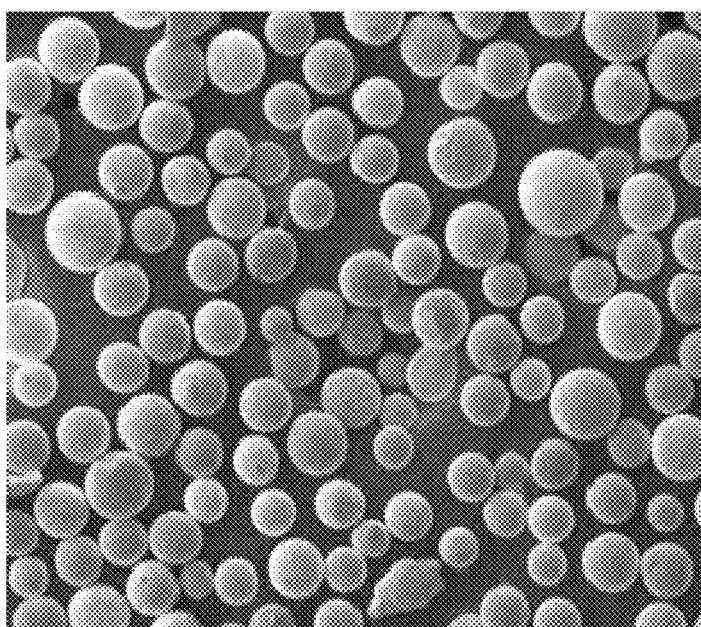
FIG. 2 illustrates an example embodiment of scrap metal feedstock in the form of metal turnings after microwave plasma processing according to the present disclosure.

The original scrap or used metal parts can be sharp turnings (e.g., having high aspect ratio, high surface area, thin, or spaghetti-like material, scrap aggregator), saw swarf (high aspect ratio, thin material), grinding swarf (less aspect ratio powder like material), grinding fines, or wash line fines (less aspect ratio, thick or thin plate like material) which can then be broken up into a feedstock of a particular PSD, such as in a milling process, and then microwave plasma processing this feedstock into spherical and dense powders. In some embodiments, the scrap can be 3D printed parts (such as failed 3D printed parts) or castings (such as failed castings). In some embodiments, the input materials can be wash line fine, saw swarfs, grinding swarfs. In some embodiments, the input materials can be used or scrap parts by processes like but not limited to grinding, milling, cutting, or turning. FIG. 1 is an illustrative example of metal turning feedstock before plasma processing. FIG. 2 depicts the illustrative example of metal turnings after plasma processing.

In some embodiments, high aspect ratio turnings from machining processes are used as feedstock into the microwave plasma melting process to produce spherical powders. In some embodiments, the average aspect ratio of the turnings is 2:1 (or about 2:1), 3:1 (or about 3:1), 5:1 (or about 5:1), 10:1 (or about 10:1), 20:1 (or about 20:1), 100:1 (or about 100:1), or 200:1 (or about 200:1). In some embodiments, the average aspect ratio of the turnings is greater than 1:1 (or about 1:1), 3:1 (or about 3:1), 5:1 (or about 5:1), greater 10:1 (or about 10:1), greater 20:1 (or about 20:1), greater 100:1 (or about 100:1), or greater 200:1 (or about 200:1). In some embodiments, the average aspect ratio of the turnings is less than, 3:1 (or about 3:1), 5:1 (or about 5:1), greater 10:1 (or about 10:1), greater 20:1 (or about 20:1), greater 100:1 (or about 100:1), or greater 200:1 (or about 200:1).

In some embodiments, the aspect ratio of a majority of the turnings is 2:1 (or about 2:1), 3:1 (or about 3:1), 5:1 (or about 5:1), 10:1 (or about 10:1), 20:1 (or about 20:1), 100:1 (or about 100:1), or 200:1 (or about 200:1). In some embodiments, the aspect ratio of a majority of the turnings is greater than 1:1 (or about 1:1), 3:1 (or about 3:1), 5:1 (or about 5:1), greater 10:1 (or about 10:1), greater 20:1 (or about 20:1), greater 100:1 (or about 100:1), or greater 200:1 (or about 200:1). In some embodiments, the aspect ratio of a majority of the turnings is less than, 3:1 (or about 3:1), 5:1 (or about 5:1), greater 10:1 (or about 10:1), greater 20:1 (or about 20:1), greater 100:1 (or about 100:1), or greater 200:1 (or about 200:1).

In some embodiments, the aspect ratio of greater than 75% of the turnings is 2:1 (or about 2:1), 3:1 (or about 3:1), 5:1 (or about 5:1), 10:1 (or about 10:1), 20:1 (or about 20:1), 100:1 (or about 100:1), or 200:1 (or about 200:1). In some embodiments, the aspect ratio of greater than 75% of the turnings is greater than 1:1 (or about 1:1), 3:1 (or about 3:1), 5:1 (or about 5:1), greater 10:1 (or about 10:1), greater 20:1 (or about 20:1), greater 100:1 (or about 100:1), or greater 200:1 (or about 200:1). In some embodiments, the aspect ratio of greater than 75% of the turnings is less than, 3:1 (or about 3:1), 5:1 (or about 5:1), greater 10:1 (or about 10:1), greater 20:1 (or about 20:1), greater 100:1 (or about 100:1), or greater 200:1 (or about 200:1).

In some embodiments, the aspect ratio of greater than 90% of the turnings is 2:1 (or about 2:1), 3:1 (or about 3:1), 5:1 (or about 5:1), 10:1 (or about 10:1), 20:1 (or about 20:1), 100:1 (or about 100:1), or 200:1 (or about 200:1). In some embodiments, the aspect ratio of greater than 90% of the turnings is greater than 1:1 (or about 1:1), 3:1 (or about 3:1), 5:1 (or about 5:1), greater 10:1 (or about 10:1), greater 20:1 (or about 20:1), greater 100:1 (or about 100:1), or greater 200:1 (or about 200:1). In some embodiments, the aspect ratio of greater than 90% of the turnings is less than, 3:1 (or about 3:1), 5:1 (or about 5:1), greater 10:1 (or about 10:1), greater 20:1 (or about 20:1), greater 100:1 (or about 100:1), or greater 200:1 (or about 200:1).

In some embodiments, the feedstock is tailored to have a volume distribution approximately equal to the volume distribution of the desired PSD of processed powder. Volume is calculated based on $\frac{4}{3}*\pi*r^3$ where 'r' is the radius of the processed powder. In some embodiments, a majority of the feedstock particles have a volume within a range of about $\frac{4}{3}\pi(x/2)^3$ and about $\frac{4}{3}\pi(y/2)^3$, wherein x is the low end of the desired particle size distribution and y is the high end of the desired particle size distribution. In some embodiments, substantially all of the feedstock particles have a volume within a range of about $\frac{4}{3}\pi(x/2)^3$ and $\frac{4}{3}\pi(y/2)^3$. In one example, the volume distribution of the preprocessed and processed feedstock can be between about 65.45 μm$^3$ and about 47,712.94 μm$^3$, corresponding to a desired particle size distribution of 5 to 15 microns for the processed powder. In some embodiments, an average or median aspect ratio, collectively, of preprocessed feedstock can be between 2:1 and 200:1, between 3:1 and 200:1, between 4:1 and 200:1, or between 5:1 and 200:1. However, any of the disclosed ratios/diameters can be used for the volume calculation. After processing, the particle size distribution in one example can be 5 to 45 microns. Other particle size distributions are also contemplated, including but not limited to particle size distributions of between 5 and 45 microns at a low end of the particle size distribution range and between 15 and 105 microns at a high end of the particle size distribution range (e.g., 5 to 15 microns, 15 to 45 microns, 45 to 105 microns).

In some embodiments, the volume distribution of the feedstock can be the same as the final spheroidized powder. In some embodiments, the overall volume of the feedstock can be the generally the same as the final spheroidized powder. In some embodiments, the overall volume of the feedstock can be within 1%, 2%, 3%, 4%, 5%, 10%, 15%, or 20% (or about 1%, about 2%, about 3%, about 4%, about 5%, about 10%, about 15%, or about 20%) of the final spheroidized powder.

In some embodiments, the feedstock may be generally spherical, or generally non-spherical. For example, the feedstock can be misshapen feedstock, cubes, filaments, wires, etc.

Figure 3:
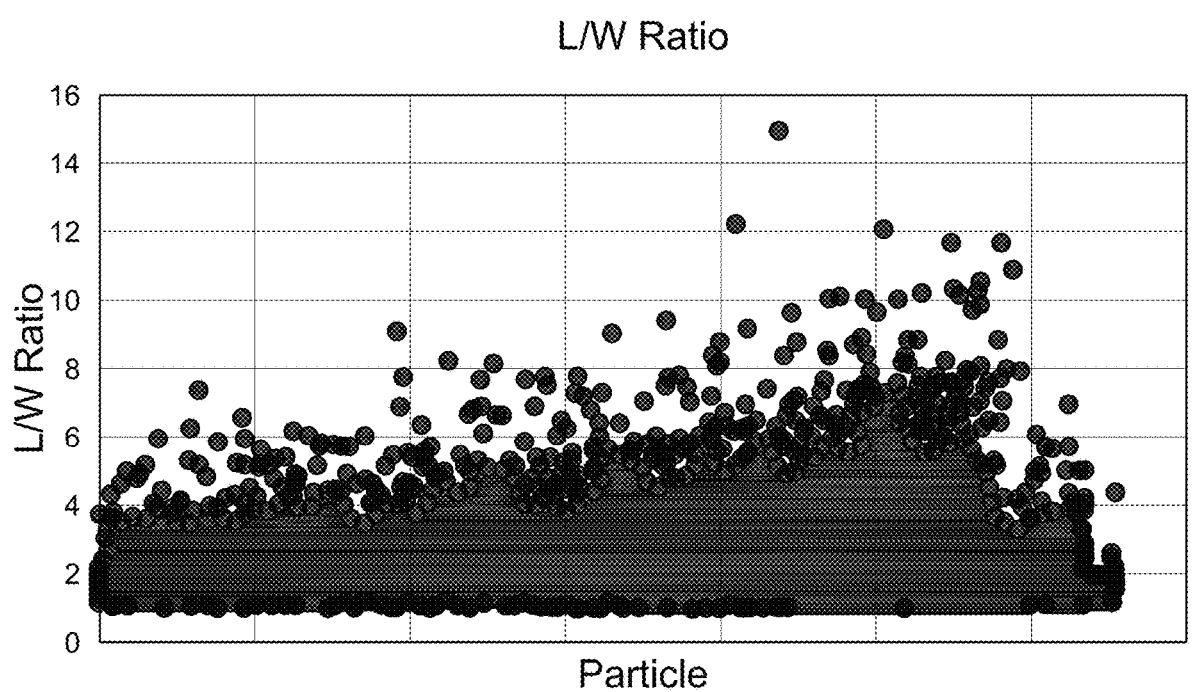
FIG. 3 illustrates an example of a plot of L/W (aspect ratio) for a sample of metal turnings before microwave plasma processing according to the present disclosure.

These aspect ratios are merely exemplary and other aspect ratios can be used as well. FIG. 3 is an illustrative example of a sample of high aspect ratio turnings. In this figure, L/W (aspect ratio) is plotted for every individual particle in a sample of high aspect ratio turnings. Aspect ratio is shown as L/W. As can be seen, the aspect ratios range from around 1:1 to 15:1 with most of the particles falling between 1:1 to 7:1. However, this is merely one example, and other aspect ratios can be used as well.

Turnings from machining processes can be first collected, cleaned from the machining oils and other impurities, and then sieved to separate small particles/turnings that can directly be used as feedstock from larges ones that need further processing to reduce their size. An example method for further reducing the size of the turnings to the desired sizes is through milling. The product of this milling process is then sieved again into different sizes and the desired size is selected to be used as feedstock for spheroidization. The materials to be used can be selected from any subtractive process that uses metal and metal alloys stock to produce parts.

More specifically, in some embodiments, the scrap may be pre-processed before they are introduced into the plasma process. For example, the scrap may be sieved to remove large agglomerations and selected to the desired size to be processed in the plasma. In some embodiments, the scrap may be cleaned with water, surfactant, detergent, solvent or any other chemical such as acids to remove contamination. In some embodiments, the scrap may be magnetically cleaned if they are contaminated with any magnetic material. In some embodiments, the cleaning removes contaminants such as ceramics and oils. In some embodiments, the scrap can be pre-treated to de-oxidize it. In some embodiments, other elements or compounds can be added to compensate or modify the chemistry of the used parts. In some embodiments, the scrap can be de-dusted to remove fines. In some embodiments, no pre-processing may be performed. All of these pre-processing techniques can also be used on the post-milled scrap feedstock.

In some embodiments, the material to be milled can be titanium or titanium alloys. Specific titanium that can be used is commercially pure titanium (CpTi) (known as CpTi), TiAl, Ti-6Al-4V (Ti-6-4), and the particular titanium material/alloy does not limit the disclosure. Titanium can be particular problematic for milling as it is highly ductile, and thus would merely bend or change shape, and would not be broken down properly into a powder without embrittling, such as through hydrogenation or cryogenics. However, embodiments of the disclosure can mill titanium or titanium alloys without such an embrittling process. This can be done through the understanding and proper selection of the scrap material to be milled, such as by only choosing material having a particular volume/size/aspect ratio.

Figure 4:
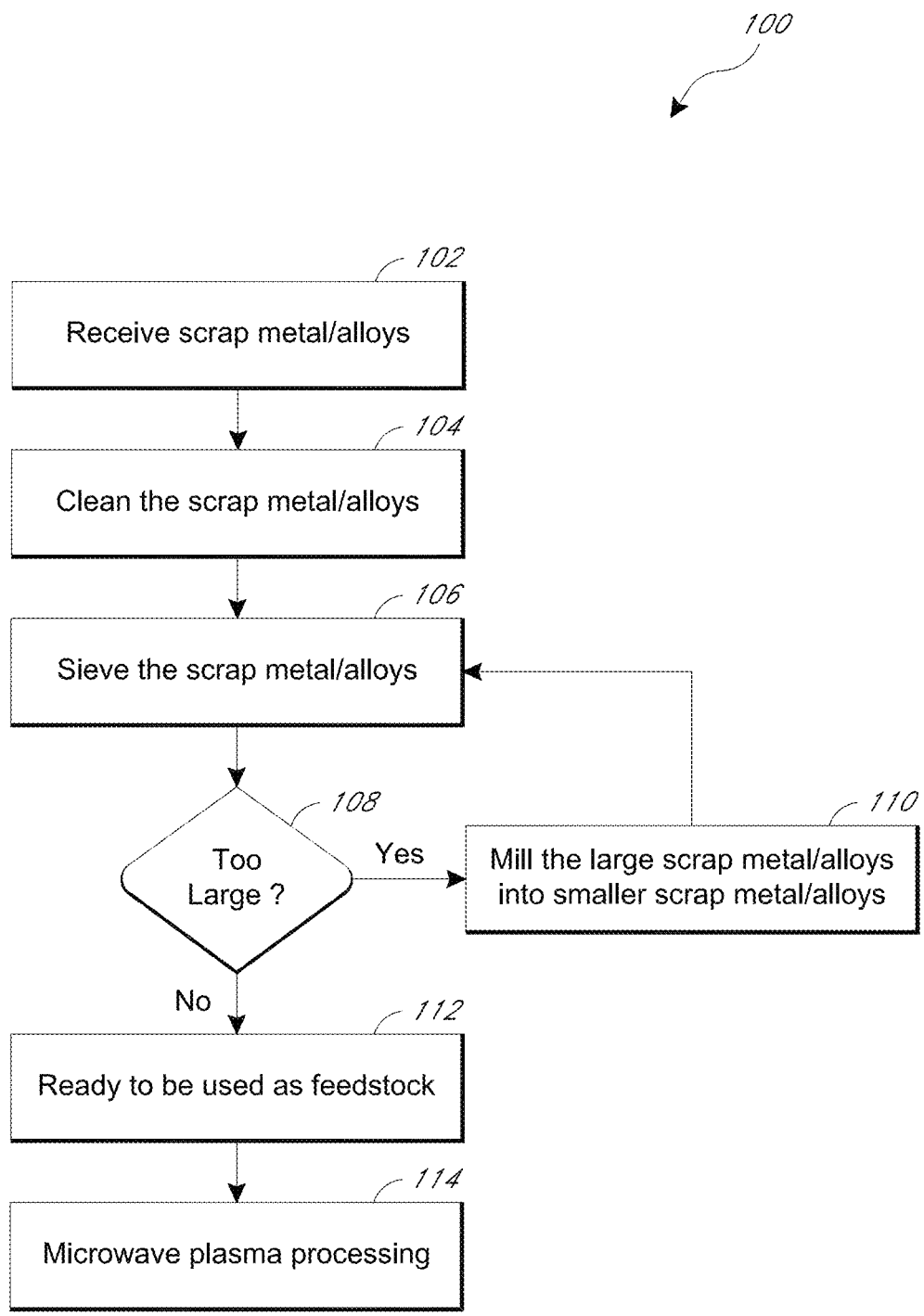
FIG. 4 illustrates an example embodiment of a method for reusing scrap metal/alloys using microwave plasma processing according to the present disclosure.

FIG. 4 is an illustrative example of a flow chart of a process 100 for reusing scrap metal/alloys. At block 102, the metal/alloy scraps can be received. In some embodiments, the metal/alloy scraps can be turnings, wash line fine, saw swarfs, grinding swarfs. The scrap metal/alloys can be used or scrap parts by processes like but not limited to grinding, milling, cutting, or turning. At block 104 the metal/alloy scraps can be cleaned. In some embodiments, the cleaning is with water, surfactant, detergent, solvent or any other chemical such as acids to remove contamination. In some embodiments, the cleaning removes machining oils and other impurities. In some embodiments, cleaning is not necessary.

At block 106/108, the metal/alloy scraps can be sieved in order to sort between pieces that are too large and pieces that are small enough to be used as feedstock. If the pieces are small enough to be used as feedstock they can pass to block 112. If the pieces are too large, they can be milled at block 110 into smaller scrap metal/alloys in order to adjust particle size. In some embodiments, the milling can be jet milling, wet milling, and/or ball milling. Block 106 can be repeated in order to additionally sieve the milled scrap metal/alloys. Alternatively, it can be decided that the milled scrap metal/alloys are ready to be used as feedstock at block 112.

Figure 11:
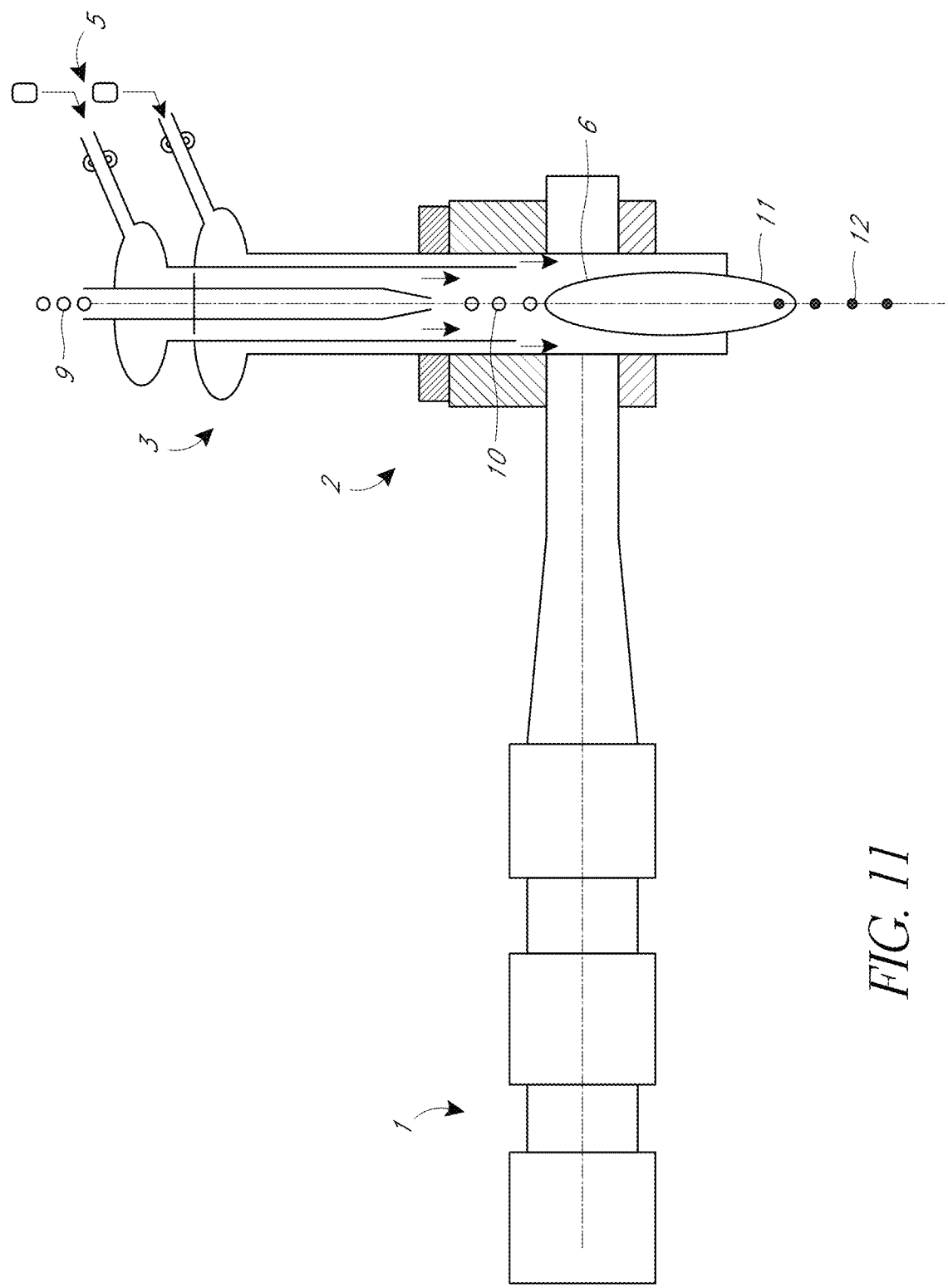
FIG. 11 illustrates an embodiment of a microwave plasma torch that can be used in the production of spheroidal metal or metal alloy powders, according to embodiments of the present disclosure.
Figure 12A:
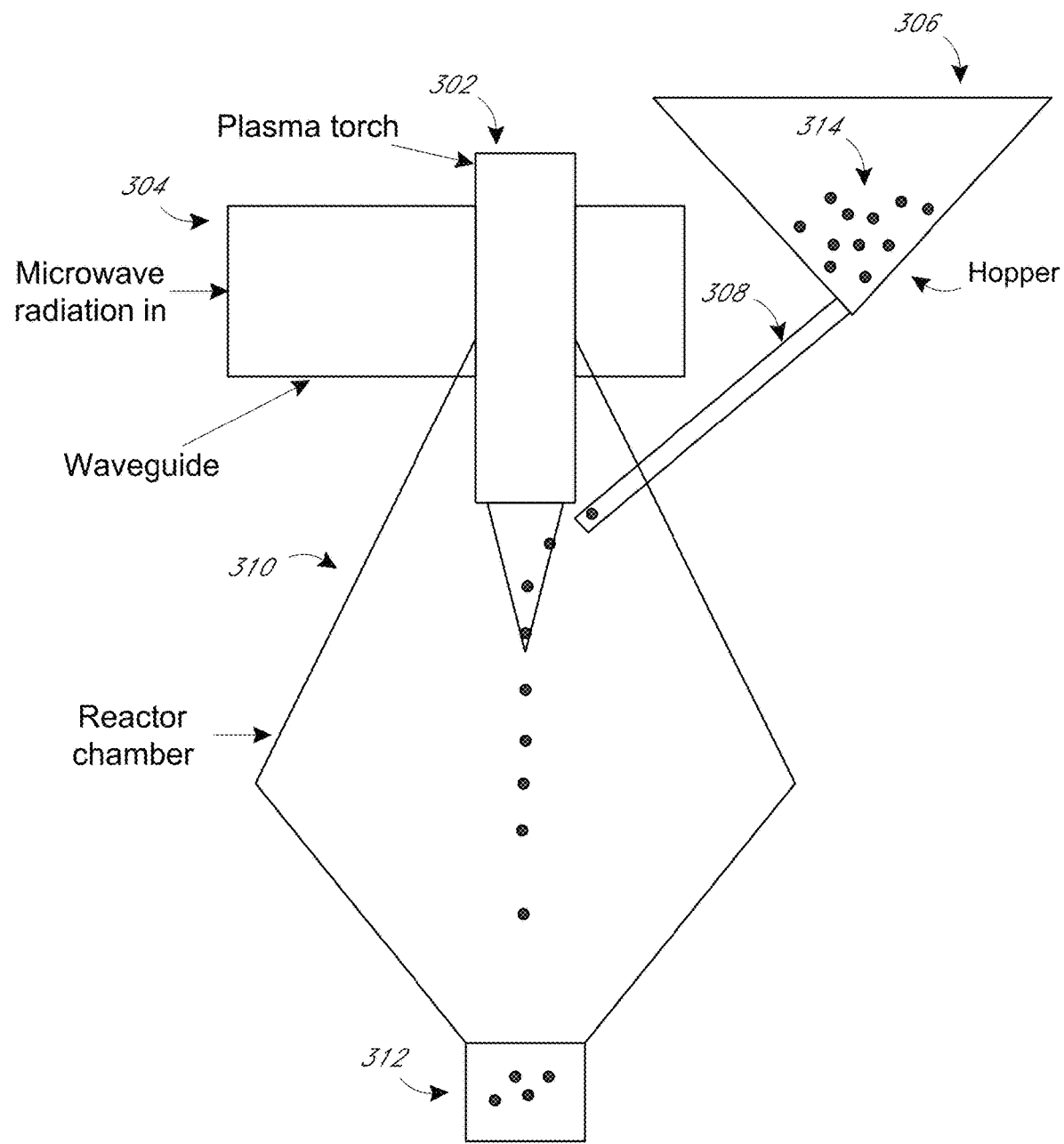
FIGS. 12A-B illustrate embodiments of a microwave plasma torch that can be used in the production of spheroidal metal or metal alloy powders, according to a side feeding hopper embodiment of the present disclosure.
Figure 12B:
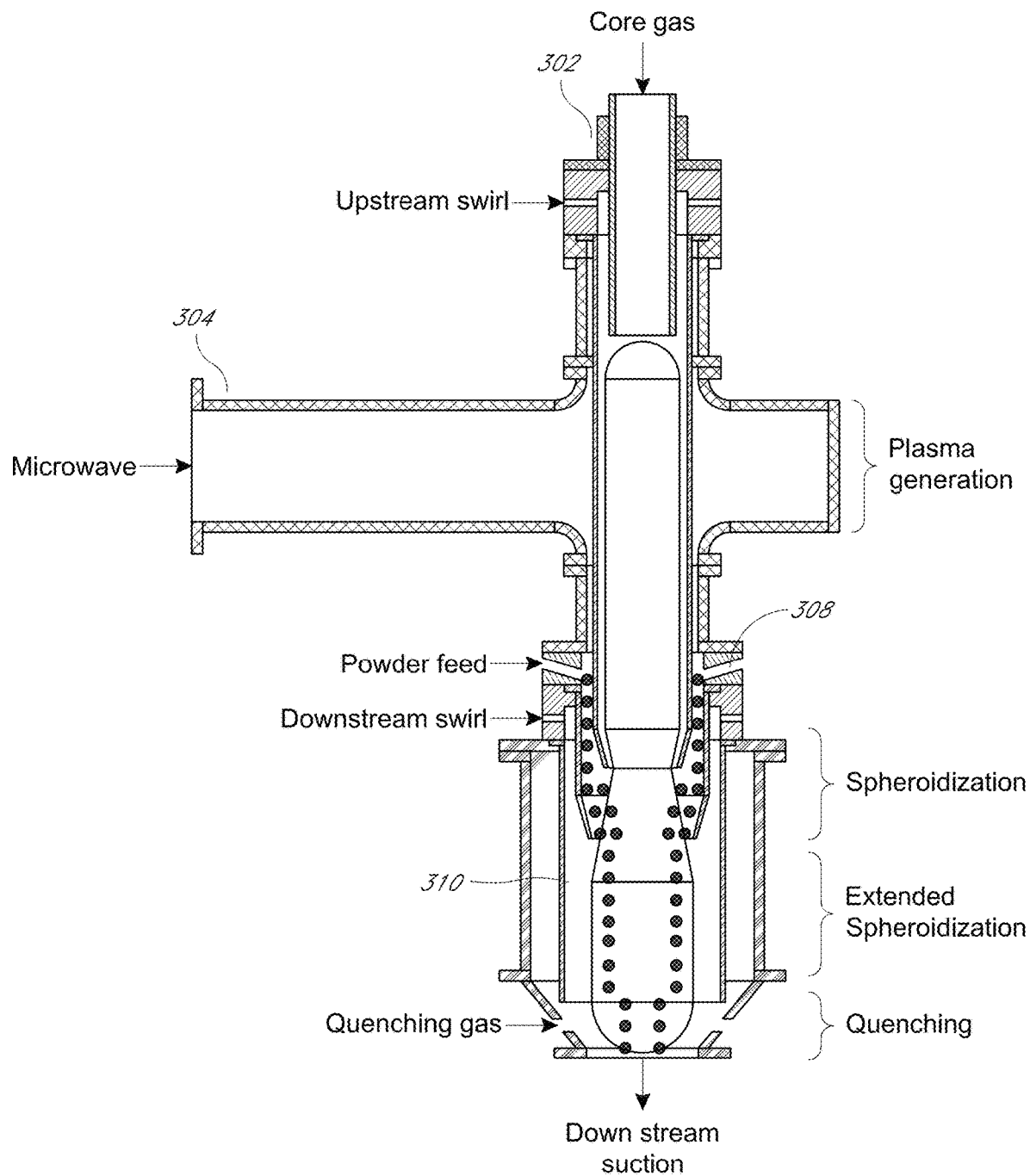

At block 112/114, the milled scrap metal/alloy that is ready to use as feedstock can be microwave plasma processed. Microwave plasma processing is described below and is also shown in FIG. 11 and FIGS. 12A-B.

As discussed above, scrap material may be extremely complicated to prepare for a feedstock.

Dehydrogenated or Non-Hydrogenated Feed Material

One aspect of the present disclosure involves a process of spheroidization of metals and metal alloy using a microwave generated plasma. The process uses readily available existing pre-screened or non-prescreened raw materials made of metal and/or metal alloys as feedstock. The powder feedstock is entrained in inert and/or reducing and/or oxidizing gas environment and injected into the microwave plasma environment. Upon injection into a hot plasma, the feedstock is spheroidized and released into a chamber filled with an inert gas and directed into hermetically sealed drums where is it stored. This process can be carried out at atmospheric pressure, in a partial vacuum, or at a slightly higher pressure than atmospheric pressure. In alternative embodiments, the process can be carried out in a low, medium, or high vacuum environment. The process can run continuously and the drums are replaced as they fill up with spheroidized metal or metal alloy particles. Furthermore, provided the homogeneity of the microwave plasma process, particle agglomeration is also reduced, if not totally eliminated, thus leading to at least maintaining the particle size distribution of the original feed materials. However, it can be challenging to obtain the proper feedstock sizing because feedstock size criteria can be stringent. Different processing methods can be used to obtain different feedstock size criteria.

In some embodiments, a hydride-dehydride (HDH) process can be used to resize large metallic or metallic alloy pieces down to a finer particle size distribution through crushing, milling, and screening. Metal and alloy powders can be manufactured using the HDH process, where bulk feedstock, such as coarse metal powders or metal/metal alloy scraps, etc., are heated in a hydrogen-containing atmosphere at high temperature (~700° C.) for a few days. This leads to the formation of a brittle metal hydride, which can readily be crushed into a fine power and sifted to yield a desired size distribution determined by the end user. To be useful in powdered metallurgy, hydrogen must be dissociated and removed from the metal by heating the metal hydride powder within vacuum for a period of time. The dehydrogenated powder must then be sifted to remove large particle agglomerations generated during process due to sintering. The typical resulting powder particles have an irregular or angular shape. The powder is submitted to a deoxidation process to remove any oxygen picked up by the powder during sifting and handling. Such HDH processes produce only coarse and irregular shaped particles. Such HDH processes must be followed by a spheroidization process, such as disclosed herein regarding a microwave plasma process, to make these particles spheroidal.

Embodiments of the disclosed HDH processes are primarily carried out as solid-state batch processes. A volume of metal powder can be loaded into a crucible(s) within a vacuum furnace. The furnace can be pumped down to a partial vacuum and is repeatedly purged with inert gas to eliminate the presence of undesired oxygen. Diffusion of the inert gas through the open space between the powder particles is slow making it difficult to fully eliminate oxygen, which otherwise contaminates the final product. Mechanical agitation may be used to churn powder allowing for more complete removal of oxygen.

Following oxygen purging the, hydrogenation may begin. The furnace is filled with hydrogen gas and heated up to a few days at high temperature to fully form the metal hydride. The brittle nature of the metal hydride allows the bulk material to be crushed into fine powders which are then screened into desired size distributions.

The next step is dehydrogenation. The screen hydride powder is loaded into the vacuum furnace then heated under partial vacuum, promoting dissociation of hydrogen from the metal hydride to form $H_2$ gas and dehydrided metal. Dehydrogenation is rapid on the particle surface where $H_2$ can readily leave the particles. However, within the bulk of the powder, $H_2$ must diffuse through the bulk of the solid before it reaches surface and leave the particle. Diffusion through the bulk is a rate-limiting process "bottle-neck" requiring relatively long reaction time for complete dehydrogenation. The time and processing temperatures required for dehydrogenation are sufficient to cause sintering between particles, which results in the formation of large particle agglomerations in the final product. Post-process sifting can eliminate the agglomerations. Before the powder can be removed from the furnace, it can be sufficiently cooled to maintain safety and limit contamination. The thermal mass of the large furnaces may take minutes or hours to sufficiently cool. The cooled powders can then be spheroidized in a separate machine. In some embodiments, the feedstock may be a non-hydrogenated material. In some embodiments, the material hasn't undergone HDH but starts without any hydrogenation. In some embodiments, this can be carried out within the disclosed plasma process.

Figure 5:
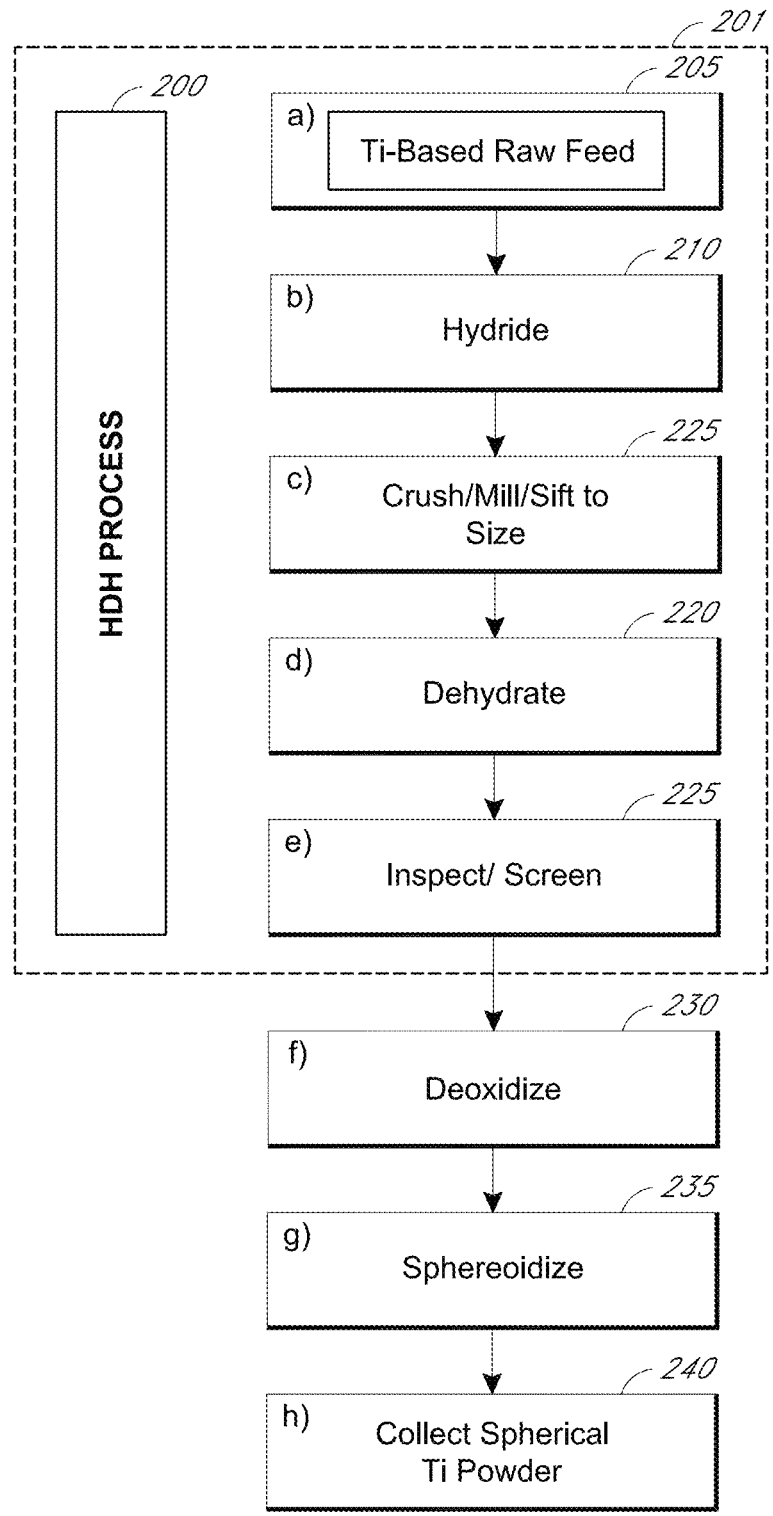
FIG. 5 illustrates an example embodiment of a method for processing hydride-dehydride (HDH) produced feedstock using microwave plasma processing according to the present disclosure.

FIG. 5 illustrates an embodiment of producing spheroidized titanium powder (200) from an HDH feed. The process flow (201) on the left of FIG. 5 presents an example process that combines a HDH process (200) with spheroidization of titanium powders. The process starts with Ti raw material (step a, 205) that is hydrogenated (step b, 210), and then crushed and sifted to size (step c, 215). Pure titanium is recovered through dehydrogenation (step d, 220). It is then screened for agglomerations and impurities, and then sifted to the size specified by the customer (step e, 225). The powder then goes through a deoxidation step to reduce or eliminate oxygen that it picked up during the sifting and screening processes. Deoxidation is useful especially for small particle sizes, such as particles below 50 microns, where the surface to volume ratio is substantial (step f, 230). The titanium particles are then spheroidized (step g, 235) and collected (step h, 240). A similar process can be used to create a Ti alloy, such as Ti 6-4, instead of pure titanium powder.

In some embodiments, the powder is entrained within an inert gas and injected into a microwave generated plasma environment (235) exhibiting a substantially uniform temperature profile between approximately 4,000 K and 8,000 K and under a partial vacuum. The hermetically sealed chamber process can also run at atmospheric pressure or slightly above atmospheric pressure to eliminate any possibility for atmospheric oxygen to leak into the process. The particles are melted in the plasma, spheroidized due to liquid surface tension, re-solidifying after exiting the plasma. The particles are then collected in sealed drums in an inert atmosphere (140). Within the plasma, the powder particles can be heated sufficiently to melt and cause convection of the liquid metal, causing dissociation of the hydrogen (if any remains after the HDH process) according to the reversible reaction where M=an arbitrary metal:

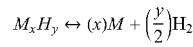

$$M_xH_y \leftrightarrow (x)M + \left(\frac{y}{2}\right)H_2$$

Within the partial vacuum, dissociation of hydrogen from the metal to form hydrogen gas is favored, driving the above reaction to the right. The rate of dissociation of hydrogen from the liquid metal is rapid, due to convection, which continually introduces $H_2$ to the liquid surface where it can rapidly leave the particle.

As discussed above, feedstock sizing can be difficult to obtain. An HDH process can aid in the process of obtaining feedstock that meets certain size criteria.

Recycling Used Powder

Disclosed herein are embodiments of methods, devices, and assemblies for recycling/reusing/reconditioning used powders (e.g., waste byproducts), such as from post processing or yield loss. In particular, embodiments of the disclosure allow for the taking of used powder and converting it into a feedstock for a microwave plasma process to form a final spheroidized powder, which can then be used in different processes, such as additive manufacturing processes, metal injection molding (MIM), or hot isostatic Pressing (HIP) processes. Thus, in some embodiments large and/or misshapen particles can be re-spheroidized. Used powder can be of differing quality and therefore it can be challenging to make use of used powder as feedstock. The feedstock can be contaminated or an incorrect size, or altogether difficult to process.

In some embodiments, the powders may be pre-processed before they are introduced into the plasma process. For example, the powders may be sieved to remove large agglomerations and selected the desired size to be processed in the plasma. In some embodiments, the powders may be cleaned with water, surfactant, detergent, solvent or any other chemical such as acids to remove contamination. In some embodiments, the powders may be magnetically cleaned if they are contaminated with any magnetic material. In some embodiments, the powder can be pre-treated to de-oxidize it. In some embodiments, other elements or compounds can be added to compensate or modify the chemistry of the powder. In some embodiments, the powder can be de-dusted to remove fines. In some embodiments, no pre-processing may be performed.

In some embodiments, the previously used powder can be modified to make it more applicable as the feedstock as the previous processing can make the powder/particles unusable. In some embodiments, "satellites", which can hurt/reduce flow can be removed. Further, used powder can become agglomerated, and the disclosed process can separate the particles in the powder. In some embodiments, contaminants, such as organics, can be removed. In some embodiments, carbon, nitrogen, oxygen, and hydrogen can be removed from the previously used powder by the disclosed process. In some embodiments, artifacts can be removed. The disclosed process can also improve the flowability of the used powders. In some embodiments, surface texture can be adjusted to reduce surface roughness of used powder to improve flowability. In some embodiments, flowability can be improved by absorbing satellites. In some embodiments, residence time and power levels can be modified to absorb satellites or evaporate them, such as with minimal affect the chemistry of the bulk powders.

Generally, embodiments of the disclosed methods can make the used powered spherical again, for example a powder having particles that were spherical and have become not spherical during a previous process. These previous processes can include, but are not limited to, to laser bed fusion, electron-beam melting, and binder jetting. In some embodiments, the used powder can be larger powder waste from an electron beam process, which can then be made into a smaller powder for laser application. In some embodiments, after use, the powder has agglomerations, increased oxygen content that is out of specification, contamination from soot and inorganic materials, and/or deformation which makes them non-spherical. In these embodiments, the powders cannot be reused without processing.

In some embodiments, PSD is with a minimum diameter of 1 micrometers (μm) and a maximum diameter of 22 μm, or a minimum of 5 μm and a maximum of 15 μm, or a minimum of 15 μm and a maximum of 45 μm or a minimum of 22 μm and a maximum of 44 μm, or a minimum of 20 μm to a maximum of 63 μm, or a minimum of 44 μm and a maximum of 70 μm, or a minimum of 70 μm and a maximum of 106 μm, or a minimum of 105 μm to a maximum of 150 μm, or a minimum of 106 μm and a maximum of 300 μm. As will be appreciated, these upper and lower values are provided for illustrative purposes only, and alternative PSD values may be used in other embodiments. In some embodiments, the disclosed processing methods retains alloy elements especially highly volatile elements such as Al, Mg, Ti, and Cu from the used powder.

This disclosure describes the rejuvenation of used powders described above to produce fresh powders with improved specifications. The microwave plasma process that is made of a microwave generated plasma is used to rejuvenate used powders described above to better specifications, so they can be used again as feedstock to the powder metallurgy processes described above.

In some embodiments, through the processing of used powders, the particle size distribution can be maintained. In some embodiments, the particle size distribution can be improved/tightened by absorbing satellites. In some embodiments, the particle size distribution can be improved/tightened by re-spheroidizing large agglomerates. For example, for laser powder bed with 15-45 micron particle size distribution, used powder can include a) 5% by weight of satellites that are absorbed or evaporated by the microwave plasma process, and b) large misshapen agglomerations, both of which can be removed by embodiments of the disclosed process. As an example, powders having a particle size distribution of 45-106 micron can be reduced to 15-45 micron, such as for laser powder bed. In some embodiments, the particle size distribution can be the D50 of the particles in the powder.

In some embodiments, through the processing of used powders, the particle size diameter can be altered. In some embodiments, the particle size diameter can be reduced. In some embodiments, the particle size diameter can be reduced to produce smaller diameter particle size by partially vaporizing the surface of large particles. For example, powder from an e-beam powder bed with 45-106 micron particle size diameter can be used to produce powder with 15-45 micron particle size to be used in a laser bed additive manufacturing process.

The plasma gases can be specific to the materials of the powders. As an example, in the case of metal and metal alloys that do not readily form nitrides, nitrogen gas can be used. One example is the processing of Inconel 718 where when it is run in a nitrogen plasma environment, the processed powder is not chemically altered and do not present any nitrogen incorporation into the bulk powder.

In the case of metals and metal alloys that readily react with nitrogen, noble gases such as argon, argon/helium mixture can be used. Also these noble gases can be mixed with hydrogen gas to increase the uniformity of the plasma. An example of a metal alloy that is susceptible to reaction with nitrogen is titanium alloy Ti 6% Al-4% V (by weight).

In some instances, noble gases and mixtures such as argon a and argon/hydrogen mixtures are used to avoid any reaction between the powders and the plasma gases. In other instances, nitrogen can be used when the processed powder is not reactive with the above mentioned gas.

The reconditioning of the used powder/particles can include the removal of artifacts, such as from a laser sintering process. Further, satellites and agglomerated materials due to overheating, for example from a laser process outside a build line, can be removed. The particular process to form the used particles, such as additive processes, powder bed fusion, and binder jetting, is not limiting and other processes could have been performed on the original particles.

Figure 6:
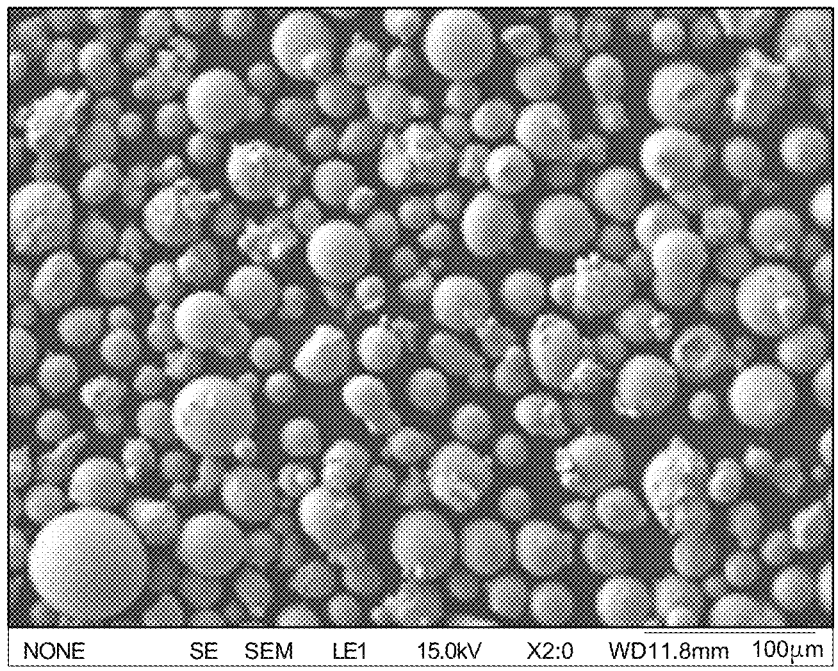
FIG. 6 and FIG. 7 illustrate example embodiments of used powder CoCr feedstock before microwave plasma processing according to the present disclosure.
Figure 7:
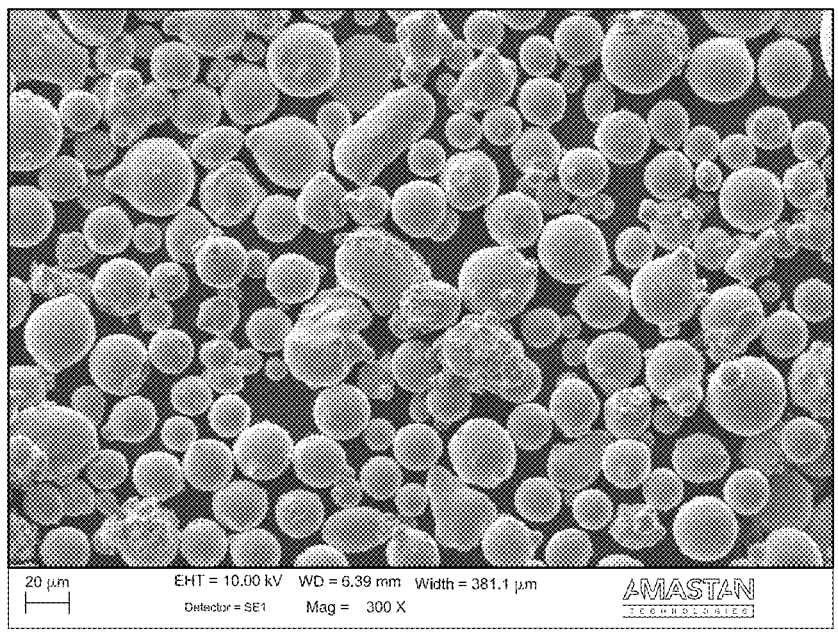
Figure 8:
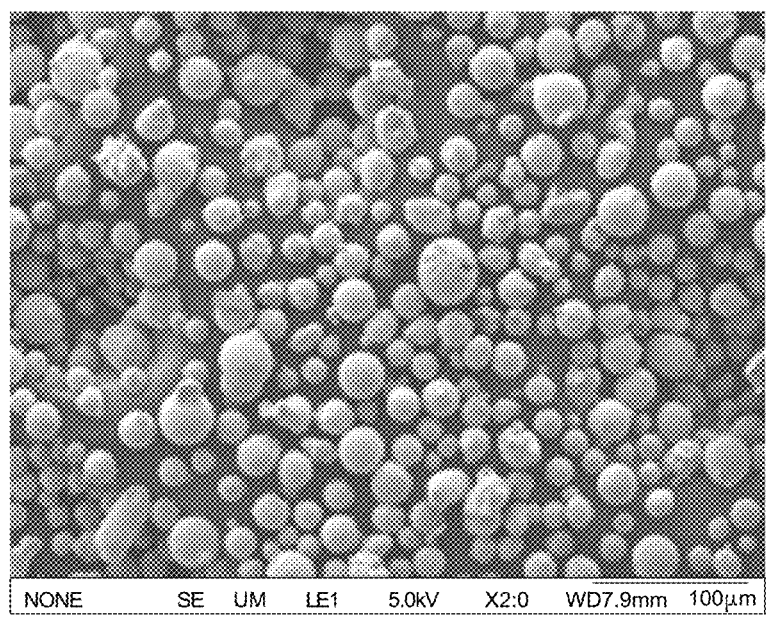
FIG. 8 and FIG. 9 illustrate example embodiments of used powder CoCr feedstock after microwave plasma processing according to the present disclosure.
Figure 9:
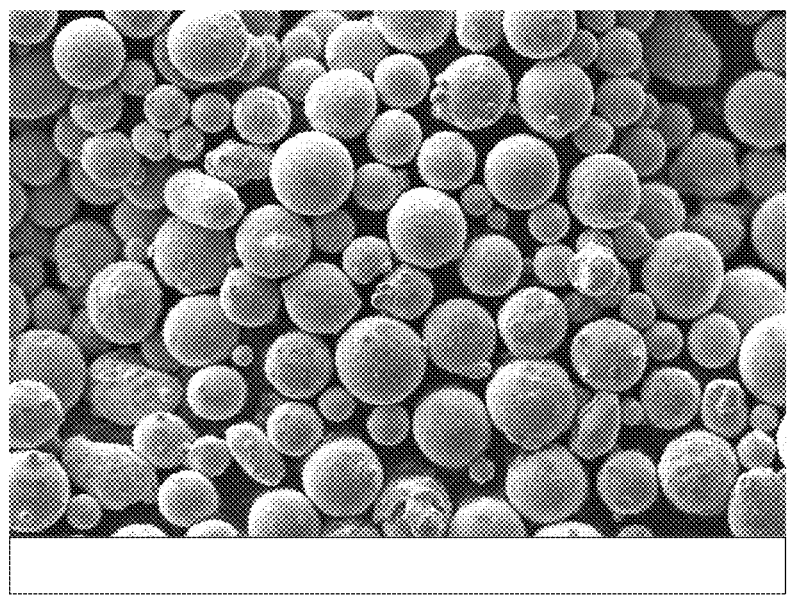

The reconditioning of the used powder/particles can allow the powder/particles to, in some embodiments, regain their original rheological properties (such as bulk density, flowability, etc.). In fact, in some embodiments, the reconditioning of used powder/particles can also improve the rheological properties. This can be achieved through the removing of any satellite on the surface through surface melting of the satellites and their incorporation into the bulk of the particle. In some cases, full melting of the particles will densify particles and remove any porosity. Full melting of the particles can be achieved through higher powder density of the plasma and longer residence time. Also the fact of spheroidizing the powders increases their flowability. Angular shaped powders are very hard to flow and their flowability increases as their shape becomes more spherical. FIG. 6 and FIG. 7 illustrates a sample of CoCr which includes satellites before processing. FIG. 8 and FIG. 9 illustrates a sample of CoCr after microwave plasma processing in which satellites are removed which can improve flowability by 25% (or by about 25%). FIG. 6 and FIG. 8 show the same powder before and after microwave plasma processing, respectively. Similarly, FIG. 7 and FIG. 9 show the same powder before and after microwave plasma processing, respectively. In some embodiments, satellites can be absorbed into larger particles.

A satellite can be a main powder particle that has a size that is within the defined particle size distribution to which a small particle of much smaller diameter that is outside the particle size distribution than the diameter of the main particle is agglomerated either through sintering or other physical processes.

An agglomeration can be two or more particles which coalesce to form a larger particle.

Further, the reconditioning can minimize oxygen pickup during the reconditioning. This can be achieved by, for example, adding hydrogen or reducing agent, running in a close environment, or running at a high temperature. In some embodiments, atmospheric pressure inert gas can be used. In some embodiments, a low oxygen environment can be used.

In some embodiments, the alloying component chemistry or minor component chemistry may not be altered. In some embodiments, certain elements with low melting temperatures can be removed from the powder.

In some embodiments, the previously used powder particles can be metal or metal alloys. In some embodiments, the previously used powder particles can be titanium or titanium alloys. Specific titanium that can be used is Ti (known as CpTi), TiAl, Ti-6-4, and the particular titanium material/alloy does not limit the disclosure. Other materials can be used as well, for example other ductile materials. In some embodiments, nickel and nickel alloys, cobalt, and cobalt alloys, steel, or stainless steel can be the previously used powder particles and the particular material is not limiting. In some embodiments, nickel metals/alloys, such as Iconel 718 and 625 superalloys, can be used. In some embodiments, YSZ, MY, CoO, $Al_2O_3$—$TiO_2$, Stainless 316L, and 17-4 can be used.

As discussed above, used powder may be extremely complicated to prepare for a feedstock.

Sphericity

In some embodiments, the final particles achieved by the plasma processing can be spherical or spheroidal, terms which can be used interchangeably. Advantageously, by using the critical and specific disclosure relevant to each of the different feedstocks disclosed, all of the feedstocks can be transformed into the spherical powders.

Embodiments of the present disclosure are directed to producing particles that are substantially spherical or spheroidal or have undergone significant spheroidization. In some embodiments, spherical, spheroidal or spheroidized particles refer to particles having a sphericity greater than a certain threshold. Particle sphericity can be calculated by calculating the surface area of a sphere $A_{s,ideal}$ with a volume matching that of the particle, V using the following equation:

$$r_{ideal} = \sqrt[3]{\frac{3V}{4\pi}}$$

$$A_{s,ideal} = 4\pi r_{ideal}^2$$

and then comparing that idealized surface area with the measured surface area of the particle, $A_{s,actual}$:

$$\text{sphericity} = \frac{A_{s,ideal}}{A_{s,actual}}.$$

In some embodiments, particles can have a sphericity of greater than 0.5, 0.6, 0.7, 0.75, 0.8, 0.9, 0.91, 0.95, or 0.99 (or greater than about 0.5, about 0.6, about 0.7, about 0.75, about 0.8, about 0.8, about 0.91, about 0.95, or about 0.99). In some embodiments, particles can have a sphericity of 0.75 or greater or 0.91 or greater (or about 0.75 or greater or about 0.91 or greater). In some embodiments, particles can have a sphericity of less than 0.5, 0.6, 0.7, 0.75, 0.8, 0.9, 0.91, 0.95, or 0.99 (or less than about 0.5, about 0.6, about 0.7, about 0.75, about 0.8, about 0.8, about 0.91, about 0.95, or about 0.99). In some embodiments, a particle is considered to be spherical, spheroidal or spheroidized if it has a sphericity at or above any of the aforementioned sphericity values, and in some preferred embodiments, a particle is considered to be spherical if its sphericity is at or about 0.75 or greater or at or about 0.91 or greater.

In some embodiments, a median sphericity of all particles within a given powder can be greater than 0.5, 0.6, 0.7, 0.75, 0.8, 0.9, 0.91, 0.95, or 0.99 (or greater than about 0.5, about 0.6, about 0.7, about 0.75, about 0.8, about 0.8, about 0.91, about 0.95, or about 0.99). In some embodiments, a median sphericity of all particles within a given powder can be less than 0.5, 0.6, 0.7, 0.75, 0.8, 0.9, 0.91, 0.95, or 0.99 (or less than about 0.5, about 0.6, about 0.7, about 0.75, about 0.8, about 0.8, about 0.91, about 0.95, or about 0.99). In some embodiments, a powder is considered to be spheroidized if all or a threshold percentage (as described by any of the fractions below) of the particles measured for the given powder have a median sphericity greater than or equal to any of the aforementioned sphericity values, and in some preferred embodiments, a powder is considered to be spheroidized if all or a threshold percentage of the particles have a median sphericity at or about 0.75 or greater or at or about 0.91 or greater.

In some embodiments, the fraction of particles within a powder that can be above a given sphericity threshold, such as described above, can be greater than 50%, 60%, 70%, 80%, 90%, 95%, or 99% (or greater than about 50%, about 60%, about 70%, about 80%, about 90%, about 95%, or about 99%). In some embodiments, the fraction of particles within a powder that can be above a given sphericity threshold, such as described above, can be less than 50%, 60%, 70%, 80%, 90%, 95%, or 99% (or less than about 50%, about 60%, about 70%, about 80%, about 90%, about 95%, or about 99%).

Particle size distribution and sphericity may be determined by any suitable known technique such as by SEM, optical microscopy, dynamic light scattering, laser diffraction, manual measurement of dimensions using an image analysis software, for example from about 15-30 measures per image over at least three images of the same material section or sample, and any other techniques.

In some embodiments, only problematic particles ("bad particles") are used in the disclosed process. For example, the problematic particles can be separated from particles that could be used as a feedstock for the microwave plasma process without any further processing ("good particles"). In some embodiments, both the good and the bad particles can be put into the process.

Powder metallurgy processes such as additive manufacturing, thermal and cold spray coating produce a large amount of waste powders. In some instances, those powders' morphology is changed from the original fresh powders and can include satellites, partial melting and/or other contaminants. Those changes can lead to a deterioration of the powder flowability, tap and bulk density, and sometime contamination such as carbon and nitrogen, and render the used powders useless for the same processes. Recycling those used powders to their original specifications can provide an economical advantage and lower costs.

In some embodiments that involve used parts, the used parts may be pre-processed before they are introduced into the plasma process. For example, the used parts may be sieved to remove large agglomerations and selected to the desired size to be processed in the plasma. In some embodiments, the used parts may be cleaned with water, surfactant, detergent, solvent or any other chemical such as acids to remove contamination. In some embodiments, the used parts may be magnetically cleaned if they are contaminated with any magnetic material. In some embodiments, the used parts can be pre-treated to de-oxidize it. In some embodiments, other elements or compounds can be added to compensate or modify the chemistry of the used parts. In some embodiments, the used parts can be de-dusted to remove fines. In some embodiments, no pre-processing may be performed. All of these pre-processing techniques can also be used on the post-milled powder.

In some embodiments where the material is milled, the material to be milled can be titanium or titanium alloys. Specific titanium that can be used is Ti (known as CpTi), TiAl, Ti-6-4, and the particular titanium material/alloy does not limit the disclosure. Titanium can be particular problematic for milling as it is highly ductile, and thus would merely bend or change shape, and would not be broken down properly into a powder without embrittling, such as through hydrogenation or cryogenics. However, embodiments of the disclosure can mill titanium or titanium alloys without such an embrittling process. This can be done through the understanding and proper selection of the scrap material to be milled, such as by only choosing material having a particular volume/size/aspect ratio.

Other materials can be used as well, for example other ductile materials. In some embodiments, nickel and nickel alloys, steel, stainless steel, copper, copper alloys, and Hastealloy can be used and the particular material is not limiting. In some embodiments, nickel metals/alloys, such as Iconel 718 and 625 superalloys, can be used. In some embodiments, oxygen content of the material needs to be in the range of a few ppm to about 2% in the case of reactive materials and a few ppm to about 1% for non-reactive materials.

In some embodiments where the material is milled, the materials can come into the milling procedure having particular advantageous properties, such as a work-hardened microstructure. Embodiments of the disclosure allow for the work-hardened microstructure to last all the way through the microwave plasma processing, thereby forming a final spheroidized powder product retaining the work-hardened material. This can be done by only microwave plasma processing the outer surface of the particles, thereby retaining the internal work-hardened microstructure. However, in some embodiments the microwave plasma processing heats/melts the particles all the way through to change the microstructure from what it originally was.

For example, work hardened metals and metal alloys feedstock can be spheroidized without affecting the microstructure by a high heating rate that will only melt the surface of the particles without affecting the bulk, hence preserving the microstructure. The feedstock materials can be turnings that have been hardened during the machining process, or large scrap pieces made of hardened material and that is milled to the desired size to be used as feedstock for the spheroidization process.

In some embodiments where the material is milled, a miller can determine the thickness of materials that can be milled based on the prescribed desired volume.

Accordingly, in some embodiments of the disclosure a user can perform the selection of pieces of ductile material that can be milled to a desired volume without embrittling the material, and then milling the material without having to embrittle first to produce particles each having the desired volume as feed material for the microwave plasma torch. The user can then introduce the particles into the plasma torch and process the powder to retain work hardened microstructure while it spheroidal.

In some embodiments that involve scrap materials, scrap material made of ductile metals and/or metal alloys is milled in a process to avoid the material hardening. The ductile product of the milling process is then sieved to different size distributions to be used as feedstock for spheroidization in the microwave plasma melting process. To preserve the ductility of the feedstock particles, the heating and cooling rates can be controlled through the residence time of the particles in the plasma and in the plasma afterglow.

Embodiments of the disclosed process can include feeding the powders using a powder feeder into a microwave generated plasma where the power density, gas flows and residence time are controlled. The process parameters such as power density, flow rates and residence time of the powder in the plasma can depend on the powder material's physical characteristics, such as the melting point and thermal conductivity. The power density can range from 20 W/cm$^3$ to 500 W/cm$^3$ (or about 20 W/cm$^3$ to about 500 W/cm$^3$). The total gas flows can range from 0.1 cfm to 50 cfm (or about 0.1 cfm to about 50 cfm), and the residence time can be tuned from 1 ms to 10 sec (or about 1 ms to about 10 sec). This range of process parameters will cover the required processing parameters for materials with a wide range of melting point and thermal conductivity.

In some embodiments that involve scrap materials, the scrap material can be material that is direct from the factory floor. In some embodiments, any remaining contaminants, such as oils, grease, or other material, can be removed before or during the disclosed process (either prior to milling, during milling, or during the microwave plasma melting).

In some embodiments, the ability to control oxygen can provide advantages, for example in the case of titanium scrap.

In some embodiments where the material is milled, the milling can be done in water. Thus, as the titanium is sheared apart fresh titanium surfaces oxidize, which increases the oxygen level.

Different environmental gasses can be used for different applications. As an example, in the case of metal and metal alloys that do not readily form nitrides, nitrogen gas can be used. One example is the processing of Inconel 718 where when it is run in a nitrogen plasma environment, the processed powder is not chemically altered and do not present any nitrogen incorporation into the bulk powder.

In some embodiments, the feedstock could be of various morphology such as angular powder, angular chips, irregular powder, and sponge powders. The feedstock can be processed to meet certain criteria for size, gas content, purity contamination and chemistry by processing such as but not limited to grinding, milling, cleaning, washing, drying and screening. The cleaning includes removing organic, ceramic, or other metallic contaminants.

In some embodiments, nickel or nickel alloys, steel or steel alloys, cobalt or cobalt alloys, and titanium or titanium alloys can be used in embodiments of the disclosure, and the particular material is not limiting. In some embodiments, ceramics can be used.

In the case of metals and metal alloys that readily react with nitrogen, noble gases such as argon, argon/helium mixture can be used. Also these noble gases can be mixed with hydrogen gas to increase the uniformity of the plasma. An example of a metal alloy that is susceptible to reaction with nitrogen is titanium alloy Ti 6% Al-4% V (by weight).

Microwave Plasma Processing

The process parameters can be optimized to obtain maximum spheroidization depending on the feedstock initial condition. For each feedstock characteristic, process parameters can be optimized for a particular outcome. U.S. Pat. Pub. No. 2018/0297122, U.S. Pat. Nos. 8,748,785 B2, and 9,932,673 B2 disclose certain processing techniques that can be used in the disclosed process, specifically for microwave plasma processing. Accordingly, U.S. Pat. Pub. No. 2018/0297122, U.S. Pat. Nos. 8,748,785 B2, and 9,932,673 B2 are incorporated by reference in its entirety and the techniques describes should be considered to be applicable to the feedstock described herein.

One aspect of the present disclosure involves a process of spheroidization of metals and metal alloys using a microwave generated plasma. The powder feedstock is entrained in an inert and/or reducing gas environment and injected into the microwave plasma environment. Upon injection into a hot plasma (or plasma plume or exhaust), the feedstock is spheroidized and released into a chamber filled with an inert gas and directed into hermetically sealed drums where is it stored. This process can be carried out at atmospheric pressure, in a partial vacuum, or at a slightly higher pressure than atmospheric pressure. In alternative embodiments, the process can be carried out in a low, medium, or high vacuum environment. The process can run continuously and the drums are replaced as they fill up with spheroidized metal or metal alloy particles.

The rate of cooling of the spheroidized metal and metal alloys can be controlled to strategically influence the microstructure of the powder. For example, rapid cooling of α-phase titanium alloys facilitates an acicular (martensite) structure. Moderate cooling rates produce a Widmanstätten microstructure, and slow cooling rates form an equiaxed microstructure. By controlling the process parameters such as cooling gas flow rate, residence time, cooling gas composition etc., microstructure of the metal and metal alloys can be controlled. The precise cooling rates required to form these structures is largely a function of the type and quantity of the alloying elements within the material.

The rate of cooling, especially when combined with the consistent and uniform heating capabilities of a microwave plasma plume, allow for control over the final microstructure. As a result, the above methods can be applied to processing metal (e.g., titanium and titanium alloys such as Ti 6-4) feedstock. For example, while certain methods may use a metal hydride feedstock, the control over microstructure is not limited thereto. In particular, the method and powders created by the present technology include the use of non-hydrided sources. For example, titanium metal and various titanium metal alloys can be utilized as the feedstock source. These materials can be crushed or milled to create particles for treatment within a microwave plasma torch.

Cooling processing parameters include, but are not limited to, cooling gas flow rate, residence time of the spheroidized particles in the hot zone, and the composition or make of the cooling gas. For example, the cooling rate or quenching rate of the particles can be increased by increasing the rate of flow of the cooling gas. The faster the cooling gas is flowed past the spheroidized particles exiting the plasma, the higher the quenching rate-thereby allowing certain desired microstructures to be locked-in. Residence time of the particles within the hot zone of the plasma can also be adjusted to provide control over the resulting microstructure. That is, the length of time the particles are exposed to the plasma determines the extent of melting of the particle (i.e., surface of the particle melted as compared to the inner most portion or core of the particle). Consequently, the extent of melting effects the extent of cooling needed for solidification and thus it is a cooling process parameter. Microstructural changes can be incorporated throughout the entire particle or just a portion thereof depending upon the extent of particle melting. Residence time can be adjusted by adjusting such operating variables of particle injection rate and flow rate (and conditions, such as laminar flow or turbulent flow) within the hot zone. Equipment changes can also be used to adjust residence time. For example, residence time can be adjusted by changing the cross-sectional area of the hot zone.

Another cooling processing parameter that can be varied or controlled is the composition of the cooling gas. Certain cooling gases are more thermally conductive than others. For example helium is considered to be a highly thermally conductive gas. The higher the thermal conductivity of the cooling gas, the faster the spheroidized particles can be cooled/quenched. By controlling the composition of the cooling gas (e.g., controlling the quantity or ratio of high thermally conductive gasses to lesser thermally conductive gases) the cooling rate can be controlled.

As is known in metallurgy, the microstructure of a metal is determined by the composition of the metal and heating and cooling/quenching of the material. In the present technology, by selecting (or knowing) the composition of the feedstock material, and then exposing the feedstock to a plasm that has the uniform temperature profile and control there over as provided by the microwave plasma torch, followed by selecting and controlling the cooling parameters control over the microstructure of the spheroidized metallic particle is achieved. In addition, the phase of the metallic material depends upon the compositions of the feed stock material (e.g., purity, composition of alloying elements, etc.) as well thermal processing. Titanium has two distinct phases known as the alpha phase (which has a hexagonal close packed crystal structure) and a beta phase which has a body centered cubic structure. Titanium can also have a mixed α+β phase. The different crystal structures yield different mechanical responses. Because titanium is allotropic it can be heat treated to yield specific contents of alpha and beta phases. The desired microstructure is not only a description of the grains (e.g., martensitic vs. equiaxed) but also the amount and location of different phases throughout.

In one exemplary embodiment, inert gas is continually purged surrounding a powdered metal feed to remove oxygen within a powder-feed hopper. A continuous volume of powder feed is then entrained within an inert gas and fed into the microwave generated plasma for dehydrogenation or for composition/maintaining purity of the spheroidized particles. In one example, the microwave generated plasma may be generated using a microwave plasma torch, as described in U.S. Patent Publication No. US 2013/0270261, and/or U.S. Pat. Nos. 8,748,785, 9,023,259, 9,259,785, and 9,206,085, each of which is hereby incorporated by reference in its entirety. In some embodiments, the particles are exposed to a uniform temperature profile at between 4,000 and 8,000 K within the microwave generated plasma. In some embodiments, the particles are exposed to a uniform temperature profile at between 3,000 and 8,000 K within the microwave generated plasma. Within the plasma torch, the powder particles are rapidly heated and melted. Liquid convection accelerates $H_2$ diffusion throughout the melted particle, continuously bringing hydrogen ($H_2$) to the surface of the liquid metal hydride where it leaves the particle, reducing the time each particle is required to be within the process environment relative to solid-state processes. As the particles within the process are entrained within an inert gas, such as argon, generally contact between particles is minimal, greatly reducing the occurrence of particle agglomeration. The need for post-process sifting is thus greatly reduced or eliminated, and the resulting particle size distribution could be practically the same as the particle size distribution of the input feed materials. In exemplary embodiments, the particle size distribution of the feed materials is maintained in the end products.

Within the plasma, plasma plume, or exhaust, the melted metals are inherently spheroidized due to liquid surface tension. As the microwave generated plasma exhibits a substantially uniform temperature profile, more than 90% spheroidization of particles could be achieved (e.g., 91%, 93%, 95%, 97%, 99%, 100%). After exiting the plasma, the particles are cooled before entering collection bins. When the collection bins fill, they can be removed and replaced with an empty bin as needed without stopping the process.

In one exemplary embodiment, inert gas is continually purged surrounding a powdered metal feed to remove oxygen within a powder-feed hopper. A continuous volume of powder feed is then entrained within an inert gas and fed into the microwave generated plasma for composition/maintaining purity of the spheroidized particles. In one example, the microwave generated plasma may be generated using a microwave plasma torch, as described in U.S. Patent Publication No. US 2013/0270261, and/or U.S. Pat. No. 8,748,785, each of which is hereby incorporated by reference in its entirety. In some embodiments, the particles are exposed to a uniform temperature profile at between 4,000 and 8,000 K within the microwave generated plasma. Within the plasma torch, the powder particles are rapidly heated and melted. As the particles within the process are entrained within an inert gas, such as argon, generally contact between particles is minimal, greatly reducing the occurrence of particle agglomeration. The need for post-process sifting is thus greatly reduced or eliminated, and the resulting particle size distribution could be practically the same as the particle size distribution of the input feed materials. In exemplary embodiments, the particle size distribution of the feed materials is maintained in the end products.

Within the plasma, the melted metals are inherently spheroidized due to liquid surface tension. As the microwave generated plasma exhibits a substantially uniform temperature profile, more than 90% spheroidization of particles could be achieved (e.g., 91%, 93%, 95%, 97%, 99%, 100%). In embodiments, both spheroidization and tailoring (e.g., changing, manipulating, controlling) microstructure are addressed or, in some instances, partially controlled, by treating with the microwave generated plasma. After exiting the plasma, the particles are cooled before entering collection bins. When the collection bins fill, they can be removed and replaced with an empty bin as needed without stopping the process.

Figure 10:
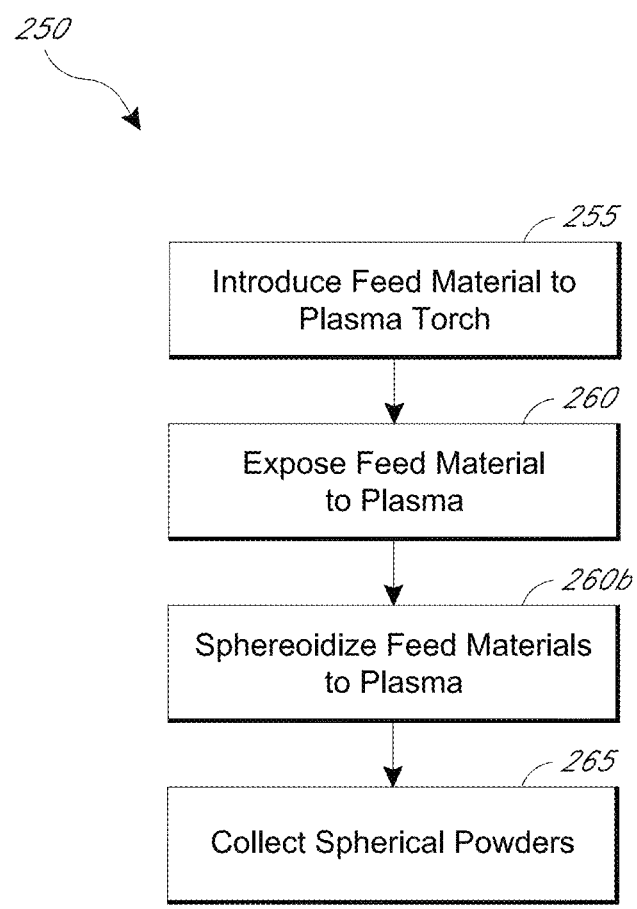
FIG. 10 illustrates an example embodiment of a method of producing spheroidal particles according to the present disclosure.

FIG. 10 is a flow chart illustrating an exemplary method (250) for producing spherical powders, according to an embodiment of the present disclosure. In this embodiment, the process (250) begins by introducing a feed material into a plasma torch (255). In some embodiments, the plasma torch is a microwave generated plasma torch or an RF plasma torch. Within the plasma torch, the feed materials are exposed to a plasma causing the materials to melt, as described above (260). The melted materials are spheroidized by surface tension, as discussed above (260b). After exiting the plasma, the products cool and solidify, locking in the spherical shape and are then collected (265).

As discussed above, the plasma torch can be a microwave generated plasma or an RF plasma torch. In one example embodiment, an AT-1200 rotating powder feeder (available from Thermach Inc.) allows a good control of the feed rate of the powder. In an alternative embodiment, the powder can be fed into the plasma using other suitable means, such as a fluidized bed feeder. The feed materials may be introduced at a constant rate, and the rate may be adjusted such that particles do not agglomerate during subsequent processing steps. In another exemplary embodiment, the feed materials to be processed are first sifted and classified according to their diameters, with a minimum diameter of 1 micrometers (μm) and a maximum diameter of 22 μm, or a minimum of 5 μm and a maximum of 15 μm, or a minimum of 15 μm and a maximum of 45 μm or a minimum of 22 μm and a maximum of 44 μm, or a minimum of 20 μm to a maximum of 63 μm, or a minimum of 44 μm and a maximum of 70 μm, or a minimum of 70 μm and a maximum of 106 μm, or a minimum of 105 μm to a maximum of 150 μm, or a minimum of 106 μm and a maximum of 300 μm. As will be appreciated, these upper and lower values are provided for illustrative purposes only, and alternative size distribution values may be used in other embodiments. This eliminates recirculation of light particles above the hot zone of the plasma and also ensures that the process energy present in the plasma is sufficient to melt the particles without vaporization. Pre-screening allows efficient allocation of microwave power necessary to melt the particles without vaporizing material.

In some embodiments, the environment and/or sealing requirements of the bins are carefully controlled. That is, to prevent contamination or potential oxidation of the powders, the environment and or seals of the bins are tailored to the application. In one embodiment, the bins are under a vacuum. In one embodiment, the bins are hermetically sealed after being filled with powder generated in accordance with the present technology. In one embodiment, the bins are back filled with an inert gas, such as, for example argon. Because of the continuous nature of the process, once a bin is filled, it can be removed and replaced with an empty bin as needed without stopping the plasma process.

The methods and processes in accordance with the disclosure can be used to make spherical metal powders or spherical metal alloy powders. For example, if the starting feed material is a titanium material, the resulting powder will be a spherical titanium powder. If the starting feed material is a titanium alloy material, the resulting powder will be a spherical titanium alloy powder. In one embodiment that features the use of a starting titanium alloy material, the resulting spherical titanium alloy powder comprises spheroidized particles of Ti Al6-V4, with between 4% to 7% weight aluminum (e.g., 5.5 to 6.5% Al) (or about 4% to about 7%, or about 5.5% to about 6.5%) and 3% to 5% weight vanadium (e.g., 3.5 to 4.5% vanadium) (or about 3% to about 5%, or about 3.5 to about 4.5%). In some embodiments, the material may have a composition that is within 10% (+/−10%) of the wt. % listed in this paragraph. In some embodiments, the feed material may be Ti Al6-V4 (or Ti-6-4) and wherein the melting and spheroidizing is controlled such that the spheroidized powder comprises Ti Al6-V4 as discussed herein. E.g., in some embodiments both the initial feedstock and the final powder is Ti Al6-V4. In some embodiments, the starting feedstock and final powder can have a different composition, but still be within the Ti Al6-V4 discussed herein. In some embodiments, the starting feedstock and final powder can have a different composition.

In some embodiments, the processing discussed herein, such as the microwave plasma processing, can be controlled to prevent and/or minimize aluminum for escaping the feedstock during the melt, which can maintain the desired composition/microstructure.

FIG. 11 illustrates an exemplary microwave plasma torch that can be used in the production of spheroidal metal or metal alloy powders, according to embodiments of the present disclosure. As discussed above, metal feed materials 9, 10 can be introduced into a microwave plasma torch 3, which sustains a microwave generated plasma 11. In one example embodiment, an entrainment gas flow and a sheath flow (downward arrows) may be injected through inlets 5 to create flow conditions within the plasma torch prior to ignition of the plasma 11 via microwave radiation source 1. In some embodiments, the entrainment flow and sheath flow are both axis-symmetric and laminar, while in other embodiments the gas flows are swirling. The feed materials 9 are introduced axially into the microwave plasma torch, where they are entrained by a gas flow that directs the materials toward the plasma. As discussed above, the gas flows can consist of a noble gas column of the periodic table, such as helium, neon, argon, etc. Within the microwave generated plasma, the feed materials are melted in order to spheroidize the materials. Inlets 5 can be used to introduce process gases to entrain and accelerate particles 9, 10 along axis 12 towards plasma 11. First, particles 9 are accelerated by entrainment using a core laminar gas flow (upper set of arrows) created through an annular gap within the plasma torch. A second laminar flow (lower set of arrows) can be created through a second annular gap to provide laminar sheathing for the inside wall of dielectric torch 3 to protect it from melting due to heat radiation from plasma 11. In exemplary embodiments, the laminar flows direct particles 9, 10 toward the plasma 11 along a path as close as possible to axis 12, exposing them to a substantially uniform temperature within the plasma. In some embodiments, suitable flow conditions are present to keep particles 10 from reaching the inner wall of the plasma torch 3 where plasma attachment could take place. Particles 9, 10 are guided by the gas flows towards microwave plasma 11 were each undergoes homogeneous thermal treatment. Various parameters of the microwave generated plasma, as well as particle parameters, may be adjusted in order to achieve desired results. These parameters may include microwave power, feed material size, feed material insertion rate, gas flow rates, plasma temperature, residence time and cooling rates. In some embodiments, the cooling or quenching rate is not less than $10^{+3}$ degrees C./sec upon exiting plasma 11. As discussed above, in this particular embodiment, the gas flows are laminar; however, in alternative embodiments, swirl flows or turbulent flows may be used to direct the feed materials toward the plasma.

FIGS. 12A-B illustrates an exemplary microwave plasma torch that includes a side feeding hopper rather than the top feeding hopper shown in the embodiment of FIG. 11, thus allowing for downstream feeding. Thus, in this implementation the feedstock is injected after the microwave plasma torch applicator for processing in the "plume" or "exhaust" of the microwave plasma torch. Thus, the plasma of the microwave plasma torch is engaged at the exit end of the plasma torch to allow downstream feeding of the feedstock, as opposed to the top-feeding (or upstream feeding) discussed with respect to FIG. 11. This downstream feeding can advantageously extend the lifetime of the torch as the hot zone is preserved indefinitely from any material deposits on the walls of the hot zone liner. Furthermore, it allows engaging the plasma plume downstream at temperature suitable for optimal melting of powders through precise targeting of temperature level and residence time. For example, there is the ability to dial the length of the plume using microwave powder, gas flows, and pressure in the quenching vessel that contains the plasma plume. Additionally, the downstream approach may allow for the use of wire feedstocks instead to produce spheroidized materials such as metals which may include aluminum, Iconel, titanium, molybdenum, tungsten, and rhenium. This spheroidization method can be applied to both ceramics and metals.

Generally, the downstream spheroidization method can utilize two main hardware configurations to establish a stable plasma plume which are: annular torch, such as described in U.S. Pat. Pub. No. 2018/0297122, or swirl torchas described in U.S. Pat. Nos. 8,748,785 B2 and 9,932,673 B2. Both FIG. 12A and FIG. 12B show embodiments of a method that can be implemented with either an annular torch or a swirl torch. A feed system close-coupled with the plasma plume at the exit of the plasma torch is used to feed powder axisymmetrically to preserve process homogeneity. Other feeding configurations may include one or several individual feeding nozzles surrounding the plasma plume. The feedstock powder can enter the plasma from any direction and can be fed in 360° around the plasma. The feedstock powder can enter the plasma at a specific position along the length of the plasma plume where a specific temperature has been measured and a residence time estimated for sufficient melting of the particles. The melted particles exit the plasma into a sealed chamber where they are quenched then collected.

The metal feed materials 314 can be introduced into a microwave plasma torch 302. A hopper 306 can be used to store the metal feed material 314 before feeding the metal feed material 314 into the microwave plasma torch 302, plume, or exhaust. The feed material 314 can be injected at any angle to the longitudinal direction of the plasma torch 302. 5, 10, 15, 20, 25, 30, 35, 40, 45, 50, or 55 degrees. In some embodiments, the feedstock can be injected an angle of greater than 5, 10, 15, 20, 25, 30, 35, 40, 45, 50, or 55 degrees. In some embodiments, the feedstock can be injected an angle of less than 5, 10, 15, 20, 25, 30, 35, 40, 45, 50, or 55 degrees. In alternative embodiments, the feedstock can be injected along the longitudinal axis of the plasma torch. The microwave radiation can be brought into the plasma torch through a waveguide 304. The feed material 314 is fed into a plasma chamber 310 and is placed into contact with the plasma generated by the plasma torch 302. When in contact with the plasma, plasma plume, or plasma exhaust, the feed material melts. While still in the plasma chamber 310, the feed material 314 cools and solidifies before being collected into a container 312. Alternatively, the feed material 314 can exit the plasma chamber 310 while still in a melted phase and cool and solidify outside the plasma chamber. In some embodiments, a quenching chamber may be used, which may or may not use positive pressure. While described separately from FIG. 11, the embodiments of FIGS. 12A-B are understood to use similar features and conditions to the embodiment of FIG. 11.

In some embodiments, implementation of the downstream injection method may use a downstream swirl, extended spheroidization, or quenching. A downstream swirl refers to an additional swirl component that can be introduced downstream from the plasma torch to keep the powder from the walls of the tube. An extended spheroidization refers to an extended plasma chamber to give the powder longer residence time. In some implementations, it may not use a downstream swirl, extended spheroidization, or quenching. In some embodiments, it may use one of a downstream swirl, extended spheroidization, or quenching. In some embodiments, it may use two of a downstream swirl, extended spheroidization, or quenching.

Injection of powder from below may results in the reduction or elimination of plasma-tube coating in the microwave region. When the coating becomes too substantial, the microwave energy is shielded from entering the plasma hot zone and the plasma coupling is reduced. At times, the plasma may even extinguish and become unstable. Decrease of plasma intensity means decreases in spheroidization level of the powder. Thus, by feeding feedstock below the microwave region and engaging the plasma plume at the exit of the plasma torch, coating in this region is eliminated and the microwave powder to plasma coupling remains constant through the process allowing adequate spheroidization.

Thus, advantageously the downstream approach may allow for the method to run for long durations as the coating issue is reduced. Further, the downstream approach allows for the ability to inject more powder as there is no need to minimize coating.

Figure 13:
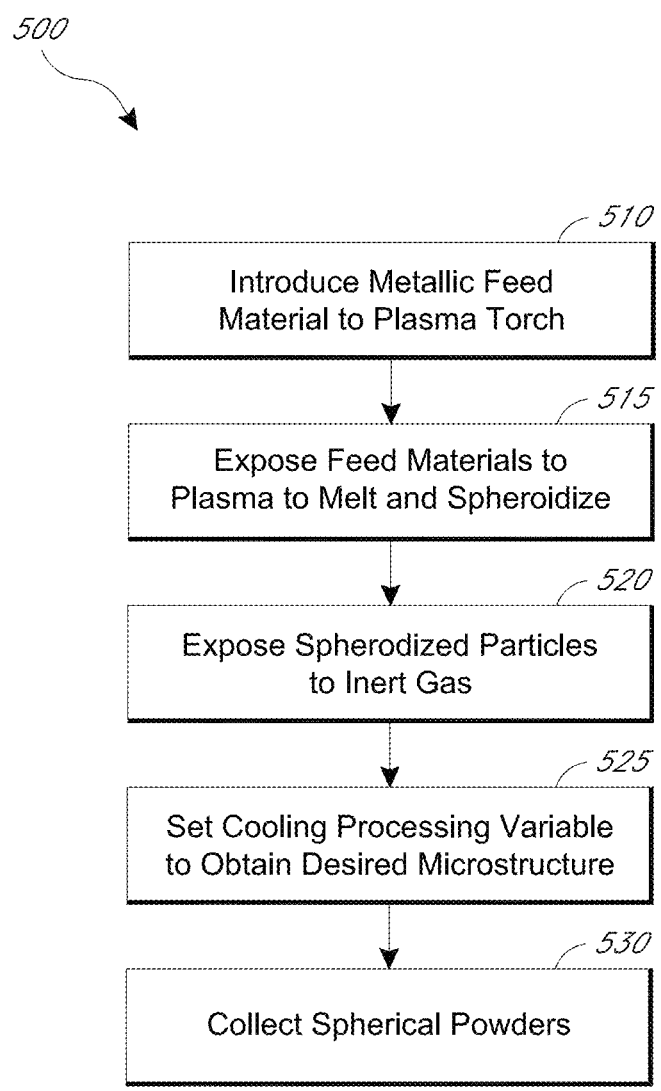
FIG. 13 illustrates an example embodiment of a method of producing titanium based (e.g., titanium, titanium alloy) spheroidal particles having a desired microstructure according to the present disclosure.

FIG. 13 illustrates an exemplary method (500) of producing spheroidized titanium particles with a tailored or desired microstructure. Method 500 includes several processing steps to treat metallic feed materials such as, for example, titanium feed materials (e.g., titanium or titanium alloys) to create spheroidized metallic particles with a desired microstructure. In step 510, metallic (e.g., titanium based) feed materials comprising particles are feed into a plasma torch. The particles can be produced from crushing, pulverizing, or milling feed stock materials. In general, the feed stock particles have an average particle size of between 1 micron and 300 microns. In step 515, the feed stock particles are exposed to a microwave generated plasma to melt at least the surface portion of the particles. The melted portions of the particles allow for spheriodization of the particles. In step 520, the spheroidized particles are exposed to an inert gas such helium, nitrogen, argon or combinations/mixtures thereof. In step 525, the cooling processing variables/conditions are set and maintained to achieve a desired microstructure. For example, in embodiments in which a martensitic microstructure is desired throughout the entire particle, the cooling processing conditions are set for rapid cooling. As a result, the residence time of the particles in the hot zone is selected to allow for melting of the entire feedstock particle, the cooling gas flow rate is set to a fastest rate, and the amount of helium forming the composition of the cooling gas is set to a maximum available. After exposing the spheroidized particles to the selected cooling conditions, the spherical powders are collected in step 530.

Figure 14:
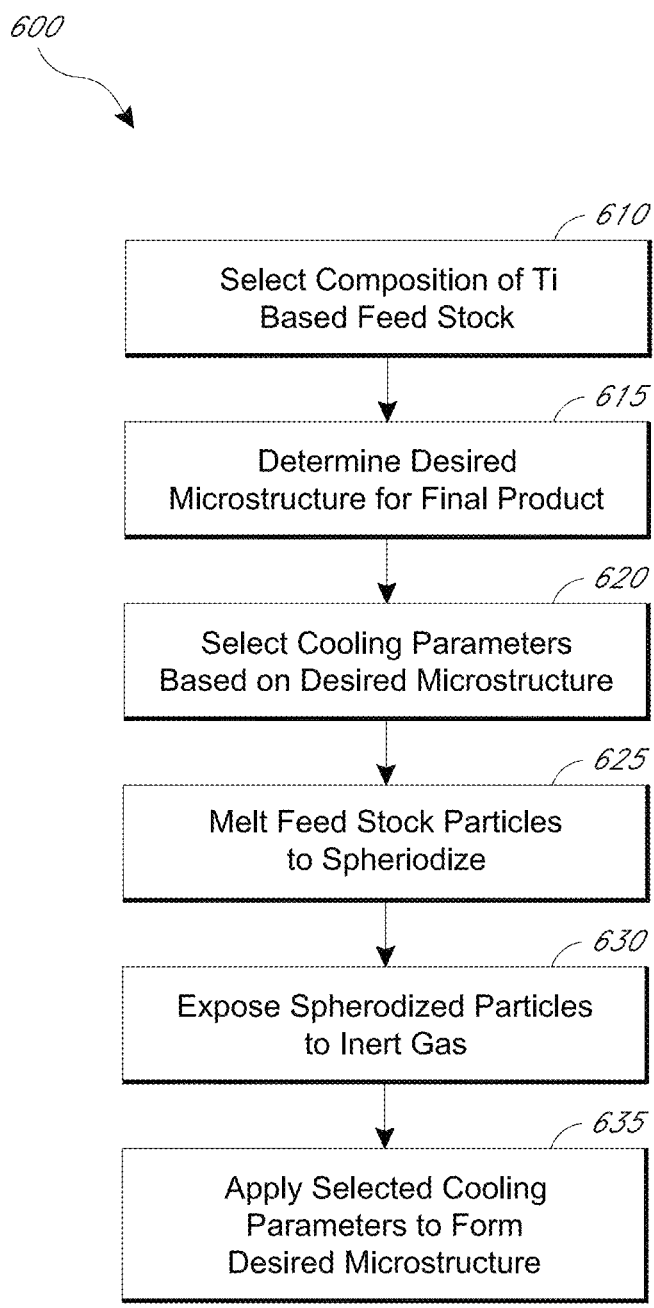
FIG. 14 illustrates an example embodiment of a method of modifying a particle microstructure according to embodiments of the present disclosure.

FIG. 14 illustrates an exemplary method (600) of modifying metallic feed stock material to have a spheroidized shape and a desired microstructure. The method of 600 includes several processing steps to treat metallic feed materials such as, for example, titanium feed materials (e.g., titanium or titanium alloys) to create spheroidized metallic particles with a desired microstructure. In this method, knowledge of the chemical composition of the feed stock (e.g., 99.9% pure titanium, Ti-6Al-4V, etc.) is used in combination with control over thermal processing conditions to achieve spheroidal particles with a desired microstructure different than the metallic feed stock material. In step 610, the composition of the Ti-based feed stock material is selected or analyzed to determine its composition. In step 615, a desired microstructure of a final product is determined. For example, it may be determined that an α-phase 99% pure Ti equiaxed microstructure throughout the spheroidized particle is desired. As a result, a slower rate of cooling will be required than that used to produce a martensitic microstructure. Cooling processing parameters will be selected (step 620), such as cooling gas flow rate, residence time, and/or composition of cooling gas to achieve such a microstructure based upon the composition of the feed stock materials. In general, the microstructure of the final product will differ from the original feed stock material. That is an advantage of the present method is to be able to efficiently process feed materials to create spheroidized particles with a desired microstructure. After selecting or determining the cooling parameters, the feed stock particles are melted in the microwave generated plasma to spheriodize the particles in step 625. The spheroidized particles are exposed to an inert gas (step 630) and the determined or selected cooling parameters are applied to form the desired microstructure.

The desired microstructure of the spheroidized particle (end product) can be tailored to meet the demands and material characteristics of its use. For example, the desired microstructure may be one that provides improved ductility (generally associated with the α-phase). In another example, the desired microstructure may be associated with the inclusion of α+β phase or regions of α with islands of β phase or vice-versa. Without wishing to be bound by theory, it is believe that the methods of the present disclosure allow for control over the phase of the spheroidized particles as the microwave generated plasma has a uniform temperature profile, fine control over the hot zone, and the ability to select and adjust cooling processing parameters.

Figure 15:
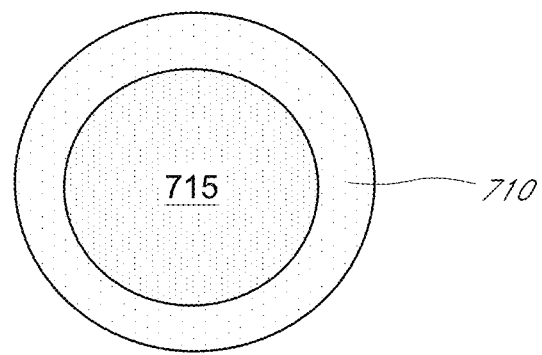
FIG. 15 illustrates an embodiment of a particle modified according to embodiments of the present disclosure.

Using the methods of the present technology, various microstructures, crystal structures and regions of differing microstructure and/or crystal structures can be produced. Accordingly, new spheroidal titanium particles can be produced efficiently. For example, due to the abilities to control the hot zone and cooling processing parameters, the present technology allows an operator to create multiple regions within the spheroidal particle. FIG. 15 shows such an embodiment. This figure illustrates a spheroidal particle which has two distinct regions. The outer or shell region 715 and an inner core 710. The original titanium feed material for this particle was a pure titanium α-phase powder. The feed material was exposed to the plasma under conditions (temperature, residence time, etc.) such that only a surface portion of the particle melted, so that spheriodization could occur. Cooling rates applied allowed for the transformation of the shell region to transform to β-phase, leaving the core to retain the α-phase. In some embodiments, for Ti-6-4, both the shell and the inner core are Ti-6-4. In some embodiments, the core composition/microstructure is retained, such as keeping Ti-6-4, and the shell composition/microstructure can be changed.

In another embodiment, not shown, the entire feed stock particle can be melted and cooling parameters can be selected and applied to create a crystal structure that has the same phase as the feed stock material (e.g., retains α-phase) or is transformed to a new phase or mixture of phases. Similarly, cooling processing parameters can be selected and applied to create spheroidal particles that have the same microstructure throughout the particle or various microstructures in two or more regions (e.g., shell region, core region).

From the foregoing description, it will be appreciated that inventive processing methods for converting unique feedstocks to spheroidized powder are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A method for manufacturing a spheroidized powder, the method comprising:
   providing a feedstock comprising a material selected from the group consisting of copper and copper alloys; and
   inserting the feedstock into a microwave plasma to form a spheroidized powder,
   wherein the spheroidized powder comprises particles with a median sphericity of at least 0.75, and
   wherein the spheroidized powder comprises at least two regions, each region having a different microstructure.

2. The method of claim 1, wherein the feedstock comprises particles having a particle size distribution of between 15 and 63 microns.

3. The method of claim 1, wherein inserting the feedstock into a microwave plasma comprises introducing the copper or copper alloy particles into an exhaust of a microwave plasma torch or into a plume of the microwave plasma torch.

4. The method claim 1, wherein the spheroidized powder has a particle size distribution of between 5 and 45 microns at a low end of the particle size distribution range and between 15 and 105 microns at a high end of the particle size distribution range.

5. The method of claim 1, wherein the at least two regions include a core portion and a skin portion, the skin portion having a microstructure that is different from a microstructure of the feedstock.

6. The method of claim 1, wherein the spheroidized powder comprises particles with a median sphericity of at least 0.90.

7. The method of claim 1, wherein the spheroidized powder comprises particles with a median sphericity of at least 0.99.

8. The method of claim 1, wherein the feedstock has a particle size of no less than 1.0 microns and no more than 300 microns.

9. A method for manufacturing a spheroidized powder having a desired particle size distribution between about x and about y, wherein x represents a low end of the particle size distribution and having a value of 5 microns and y represents a high end of the particle size distribution and having a value of 45 microns, the method comprising:
   introducing copper or copper alloy particles into a microwave plasma torch; and
   melting and spheroidizing the copper or copper alloy particles within the microwave plasma torch to form spheroidized powder having the desired particle size distribution of about x to about y;
   wherein the spheroidized powder comprises particles with a median sphericity of at least 0.75, and
   wherein the collective average or median aspect ratio of the copper or copper alloy particles is between 5:1 to 100:1.

10. The method of claim 9, wherein the collective average or median aspect ratio of the copper or copper alloy particles is between 5:1 to 20:1.

11. The method of claim 9, wherein the collective average or median aspect ratio of the copper or copper alloy particles is between 10:1 to 100:1.

12. The method of claim 9, wherein the introducing copper or copper alloy particles into the microwave plasma torch comprises introducing the copper or copper alloy particles into an exhaust of the microwave plasma torch or into a plume of the microwave plasma torch.

13. The method of claim 9, wherein the copper or copper alloy particles comprise a particle size distribution of between 15 and 63 microns.

14. The method of claim 9, wherein the spheroidized powder has a particle size distribution of between 5 and 45 microns at a low end of the particle size distribution range and between 15 and 105 microns at a high end of the particle size distribution range.

15. The method of claim 9, wherein the copper or copper alloy particles have a particle size of no less than 1.0 microns and no more than 300 microns.

* * * * *